United States Patent
Zhu et al.

(10) Patent No.: US 11,751,248 B2
(45) Date of Patent: Sep. 5, 2023

(54) RANDOM ACCESS METHOD, APPARATUS, AND DEVICE

(71) Applicant: HUAWEI TECHNOLOGIES CO., LTD., Guangdong (CN)

(72) Inventors: Peng Zhu, Tokyo (JP); Jing Tu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 111 days.

(21) Appl. No.: 16/868,190

(22) Filed: May 6, 2020

(65) Prior Publication Data
US 2020/0267776 A1 Aug. 20, 2020

Related U.S. Application Data

(63) Continuation of application No. PCT/CN2018/112264, filed on Oct. 27, 2018.

(30) Foreign Application Priority Data

Nov. 15, 2017 (CN) .......................... 201711137116.X

(51) Int. Cl.
*H04W 74/08* (2009.01)
(52) U.S. Cl.
CPC ................ *H04W 74/0833* (2013.01)
(58) Field of Classification Search
CPC .. H04W 74/0833; H04W 24/02; H04W 7/088
See application file for complete search history.

(56) References Cited

U.S. PATENT DOCUMENTS 10,123,218 B1 *  11/2018  Yang .................... H04W 60/04
2010/0164802 A1 *  7/2010  Li .......................... H01Q 1/246
                                                                342/368
(Continued)

FOREIGN PATENT DOCUMENTS

CN         104521312 A      4/2015
CN         106465148 A      2/2017
(Continued)

OTHER PUBLICATIONS

LG Electronics, "Discussion on RACH Procedure without Tx/RX Reciprocity," 3GPP TSG RAN WG1 Meeting #87, R1-1611797, Reno, USA, Nov. 14-18, 2016, 5 pages.
(Continued)

*Primary Examiner* — Derrick W Ferris
*Assistant Examiner* — Chuong M Nguyen
(74) *Attorney, Agent, or Firm* — Fish & Richardson P.C.

(57) ABSTRACT

The present disclosure relates to random access methods, apparatus, and devices. One example method includes adjusting a sweeping parameter of a receive beam when at least one target receive beam is determined based on prior information, and sweeping the receive beam based on the adjusted sweeping parameter. The prior information includes at least one of cell historical information or cell handover information. The sweeping parameter includes at least one of a sweeping frequency, a sweeping sequence, a beam direction, or a beam width. The receive beam includes the at least one target receive beam. The receive beam is used to receive a random access preamble sent by a terminal. After a base station receives, on the receive beam, the random access preamble sent by the terminal, the terminal randomly accesses the base station for data communication.

18 Claims, 12 Drawing Sheets

(56) References Cited

U.S. PATENT DOCUMENTS

| | | | |
|---|---|---|---|
| 2011/0065448 A1* | 3/2011 | Song | H04B 7/0632 |
| | | | 455/452.2 |
| 2016/0323075 A1* | 11/2016 | Jeong | H04B 7/024 |
| 2017/0026962 A1* | 1/2017 | Liu | H04W 74/0833 |
| 2017/0207843 A1* | 7/2017 | Jung | H04W 74/006 |
| 2017/0331670 A1* | 11/2017 | Parkvall | H04J 11/0059 |
| 2017/0353870 A1* | 12/2017 | Rybakowski | H04B 7/0634 |
| 2017/0366236 A1* | 12/2017 | Ryoo | H04B 7/0617 |
| 2018/0054790 A1* | 2/2018 | Islam | H04W 16/28 |
| 2018/0076520 A1 | 3/2018 | Ma | |
| 2018/0176065 A1* | 6/2018 | Deng | H04W 48/12 |
| 2018/0368005 A1* | 12/2018 | Fukui | H04B 7/088 |
| 2019/0215049 A1* | 7/2019 | Guerreiro | H04B 7/0626 |
| 2019/0306888 A1* | 10/2019 | Takeda | H04W 74/08 |
| 2020/0099437 A1* | 3/2020 | Harada | H04W 74/0833 |
| 2020/0145079 A1* | 5/2020 | Marinier | H04B 7/0695 |
| 2020/0186308 A1* | 6/2020 | Yan | H04L 5/00 |
| 2020/0187259 A1* | 6/2020 | Liu | H04B 7/088 |

FOREIGN PATENT DOCUMENTS

| | | | | |
|---|---|---|---|---|
| CN | 106793059 A | | 5/2017 | |
| CN | 106879010 A | | 6/2017 | |
| CN | 106900074 A | | 6/2017 | |
| CN | 107041012 A | | 8/2017 | |
| CN | 107223361 A | | 9/2017 | |
| CN | 109587706 A | * | 4/2019 | ............ H01Q 3/30 |
| WO | 2016187797 A1 | | 12/2016 | |
| WO | 2017054249 A1 | | 4/2017 | |

OTHER PUBLICATIONS

Office Action issued in Chinese Application No. 201711137116.X dated Apr. 15, 2020, 19 pages (with English translation).

PCT International Search Report and Written Opinion issued in International Application No. PCT/CN2018/112264 dated Jan. 30, 2019, 13 pages (with English translation).

Extended European Search Report issued in European Application No. 18878504.2 dated Oct. 30, 2020, 6 pages.

Office Action issued in Indian Application No. 202047020185 dated Jan. 27, 2022, 8 pages.

* cited by examiner

-PRIOR ART-

| PRACH slot symbol# | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Receive beam ID of each symbol in a slot #1 | | | 0 | 1 | 2 | 3 | 4 | 5 | 6 | 7 | 8 | 9 | 10 | |
| Receive beam ID of each symbol in a slot #2 | | | 11 | 12 | 13 | 14 | 15 | 16 | 17 | 18 | 19 | 20 | 21 | |
| Receive beam ID of each symbol in a slot #3 | | | 22 | 23 | 24 | 25 | 26 | 27 | 28 | 29 | 30 | 31 | 32 | |
| Receive beam ID of each symbol in a slot #4 | | | 33 | 34 | 35 | 36 | 37 | 38 | 39 | 40 | 41 | 42 | 43 | |
| Receive beam ID of each symbol in a slot #5 | | | 44 | 45 | 46 | 47 | 48 | 49 | 50 | 51 | 52 | 53 | 54 | |
| Receive beam ID of each symbol in a slot #6 | | | 55 | 0 | 1 | 2 | 3 | 4 | 5 | 6 | 7 | 8 | 9 | |

FIG. 3

-PRIOR ART-

| PRACH slot symbol# | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Receive beam ID of each symbol in a slot #1 | | | 0 | 1 | 2 | 3 | 4 | 5 | 6 | 7 | 8 | 9 | 10 | |
| Receive beam ID of each symbol in a slot #2 | | | 11 | 12 | 13 | 14 | 15 | 16 | 17 | 18 | 19 | 20 | 21 | |
| Receive beam ID of each symbol in a slot #3 | | | 22 | 23 | 0 | 1 | 2 | 3 | 4 | 5 | 6 | 7 | 8 | |

FIG. 4

-PRIOR ART-

| PRACH slot symbol# | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Receive beam ID of each symbol in a slot #1 | | | 0 28 | 1 29 | 2 30 | 3 31 | 4 32 | 5 33 | 6 34 | 7 35 | 8 36 | 9 37 | 10 38 | |
| Receive beam ID of each symbol in a slot #2 | | | 11 39 | 12 40 | 13 41 | 14 42 | 15 43 | 16 44 | 17 45 | 18 46 | 19 47 | 20 48 | 21 49 | |
| Receive beam ID of each symbol in a slot #3 | | | 22 50 | 23 51 | 24 52 | 25 53 | 26 54 | 27 55 | 0 28 | 1 29 | 2 30 | 3 31 | 4 32 | |

FIG. 5

-PRIOR ART-

| PRACH slot symbol# | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Receive beam ID of each symbol in a slot #1 | | | 0 4 | | 1 5 | | 2 6 | | 3 7 | | 8 12 | | | |
| Receive beam ID of each symbol in a slot #2 | | | 9 13 | | 10 14 | | 11 15 | | 16 20 | | 17 21 | | | |
| Receive beam ID of each symbol in a slot #3 | | | 18 22 | | 19 23 | | 0 4 | | 1 5 | | 2 6 | | | |

-PRIOR ART-

| PRACH slot symbol# | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Receive beam ID of each symbol in a slot #1 | | | 6 | 7 | 0 | 1 | 2 | 3 | 4 | 5 | 8 | 9 | 10 | |
| Receive beam ID of each symbol in a slot #2 | | | 20 | 21 | 11 | 12 | 13 | 14 | 15 | 16 | 17 | 18 | 19 | |
| Receive beam ID of each symbol in a slot #3 | | | 34 | 35 | 22 | 23 | 24 | 25 | 26 | 27 | 28 | 29 | 30 | |
| Receive beam ID of each symbol in a slot #4 | | | 6 | 7 | 31 | 32 | 33 | 36 | 37 | 38 | 39 | 40 | 41 | |
| Receive beam ID of each symbol in a slot #5 | | | 20 | 21 | 42 | 43 | 44 | 45 | 46 | 47 | 48 | 49 | 50 | |
| Receive beam ID of each symbol in a slot #6 | | | 34 | 35 | 51 | 52 | 53 | 54 | 55 | 0 | 1 | 2 | 3 | |

| PRACH slot symbol# | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Receive beam ID of each symbol in a slot #1 | | | 3 | 4 | 5 | 11 | 12 | 13 | 0 | 1 | 2 | 6 | 7 | |
| Receive beam ID of each symbol in a slot #2 | | | 19 | 20 | 21 | 3 | 4 | 5 | 8 | 9 | 10 | 14 | 15 | |
| Receive beam ID of each symbol in a slot #3 | | | 11 | 12 | 13 | 19 | 20 | 21 | 16 | 17 | 18 | 22 | 23 | |
| Receive beam ID of each symbol in a slot #4 | | | 3 | 4 | 5 | 11 | 12 | 13 | 0 | 1 | 2 | 6 | 7 | |
| Receive beam ID of each symbol in a slot #5 | | | 19 | 20 | 21 | 3 | 4 | 5 | 8 | 9 | 10 | 14 | 15 | |
| Receive beam ID of each symbol in a slot #6 | | | 11 | 12 | 13 | 19 | 20 | 21 | 16 | 17 | 18 | 22 | 23 | |

FIG. 10

| PRACH slot symbol# | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Receive beam ID of each symbol in a slot #1 | | | 6 34 | 7 35 | 20 48 | 21 49 | 0 28 | 1 29 | 2 30 | 3 31 | 4 32 | 5 33 | 8 36 | |
| Receive beam ID of each symbol in a slot #2 | | | 6 34 | 7 35 | 20 48 | 21 49 | 9 37 | 10 38 | 11 39 | 12 40 | 13 41 | 14 42 | 15 43 | |
| Receive beam ID of each symbol in a slot #3 | | | 6 34 | 7 35 | 20 48 | 21 49 | 16 44 | 17 45 | 18 46 | 19 47 | 22 50 | 23 51 | 24 52 | |
| Receive beam ID of each symbol in a slot #4 | | | 6 34 | 7 35 | 20 48 | 21 49 | 25 53 | 26 54 | 27 55 | 0 28 | 1 29 | 2 30 | 3 31 | |

FIG. 11

| PRACH slot symbol# | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Receive beam ID of each symbol in a slot #1 | | | 3 11 | | 4 12 | | 0 5 | | 1 6 | | 2 7 | | | |
| Receive beam ID of each symbol in a slot #2 | | | 19 3 | | 20 4 | | 8 13 | | 9 14 | | 10 15 | | | |
| Receive beam ID of each symbol in a slot #3 | | | 11 19 | | 12 20 | | 16 21 | | 17 22 | | 18 23 | | | |
| Receive beam ID of each symbol in a slot #4 | | | 3 11 | | 4 12 | | 0 5 | | 1 6 | | 2 7 | | | |
| Receive beam ID of each symbol in a slot #5 | | | 19 3 | | 20 4 | | 8 13 | | 9 14 | | 10 15 | | | |
| Receive beam ID of each symbol in a slot #6 | | | 11 19 | | 12 20 | | 16 21 | | 17 22 | | 18 23 | | | |

FIG. 12

| PRACH slot symbol# | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Receive beam ID of each symbol in a slot #1 | | | 28 | 0 | 1 | 2 | 3 | 4 | 5 | 6 | 7 | 8 | 9 | |
| Receive beam ID of each symbol in a slot #2 | | | 28 | 10 | 11 | 12 | 13 | 14 | 15 | 16 | 17 | 18 | 19 | |
| Receive beam ID of each symbol in a slot #3 | | | 20 | 21 | 22 | 23 | 24 | 25 | 26 | 27 | 28 | 29 | 30 | |
| Receive beam ID of each symbol in a slot #4 | | | 31 | 32 | 33 | 34 | 35 | 36 | 37 | 38 | 39 | 40 | 41 | |
| Receive beam ID of each symbol in a slot #5 | | | 42 | 43 | 44 | 45 | 46 | 47 | 48 | 49 | 50 | 51 | 52 | |
| Receive beam ID of each symbol in a slot #6 | | | 53 | 54 | 55 | 0 | 1 | 2 | 3 | 4 | 5 | 6 | 7 | |

FIG. 14

| PRACH slot symbol# | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Receive beam ID of each symbol in a slot #1 | | | 28 | 0 | 1 | 2 | 3 | 4 | 5 | 6 | 7 | 8 | 9 | |
| Receive beam ID of each symbol in a slot #2 | | | 28 | 10 | 11 | 12 | 13 | 14 | 15 | 16 | 17 | 18 | 19 | |
| Receive beam ID of each symbol in a slot #3 | | | 28 | 20 | 21 | 22 | 23 | 24 | 25 | 26 | 27 | 28 | 29 | |
| Receive beam ID of each symbol in a slot #4 | | | 28 | 30 | 31 | 32 | 33 | 34 | 35 | 36 | 37 | 38 | 39 | |
| Receive beam ID of each symbol in a slot #5 | | | 40 | 41 | 42 | 43 | 44 | 45 | 46 | 47 | 48 | 49 | 50 | |
| Receive beam ID of each symbol in a slot #6 | | | 51 | 52 | 53 | 54 | 55 | 0 | 1 | 2 | 3 | 4 | 5 | |

FIG. 15

| PRACH slot symbol# | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Receive beam ID of each symbol in a slot #1 | | | 15 | 7 | 3 | 4 | 5 | 11 | 12 | 13 | 0 | 1 | 2 | |
| Receive beam ID of each symbol in a slot #2 | | | 7 | 19 | 20 | 21 | 3 | 4 | 5 | 6 | 8 | 9 | 10 | |
| Receive beam ID of each symbol in a slot #3 | | | 7 | 11 | 12 | 13 | 19 | 20 | 21 | 14 | 15 | 16 | 17 | |
| Receive beam ID of each symbol in a slot #4 | | | 3 | 4 | 5 | 11 | 12 | 13 | 18 | 22 | 23 | 0 | 1 | |
| Receive beam ID of each symbol in a slot #5 | | | 19 | 20 | 21 | 3 | 4 | 5 | 2 | 6 | 7 | 8 | 9 | |
| Receive beam ID of each symbol in a slot #6 | | | 11 | 12 | 13 | 19 | 20 | 21 | 10 | 14 | 15 | 16 | 17 | |

RANDOM ACCESS METHOD, APPARATUS, AND DEVICE

CROSS-REFERENCE TO RELATED APPLICATIONS

This application is a continuation of International Application No. PCT/CN2018/112264, filed on Oct. 27, 2018, which claims priority to Chinese Patent Application No. 201711137116.X, filed on Nov. 15, 2017. The disclosures of the aforementioned applications are hereby incorporated by reference in their entireties.

TECHNICAL FIELD

The present invention relates to the communications field, and in particular, to a random access method, apparatus, and device.

BACKGROUND

In a wireless communications system (the wireless communications system includes systems of various standards such as 4G and 5G, but is not limited to the specific system described above), a terminal needs to establish uplink synchronization, access a cell, or apply for uplink scheduling through random access. The terminal may randomly access a wireless communications network by using two methods: non-contention based random access and contention-based random access. In a contention-based random access process, the terminal voluntarily selects a time-frequency resource to send an access request message to a base station.

As shown in FIG. 1, the contention-based random access process in the prior art includes four steps:
1. The terminal sends a random access preamble to the base station.
2. After detecting the random access preamble, the base station feeds back a random access response (RAR) to the terminal. The random access response includes a timing advance and Msg.3 scheduling information.
3. After receiving the RAR, the terminal sends a layer2/layer3 (L2/L3) message to the base station.
4. The base station sends a contention manner resolution message to the terminal.

In a fifth generation (5G) mobile communications technology, if a base station uses a hybrid beamforming (HBF) architecture, the base station can use only one or several beams for receiving at a same moment (a time domain symbol or a slot), as shown in FIG. 2. Therefore, when receiving a random access preamble, the base station needs to perform receive beam sweeping.

However, in the prior art, when receiving the random access preamble, the base station performs receive beam polling, in other words, sequentially traverses all beams in a cell, and receives and detects the random access preamble.

Assuming that 56 beams (single polarization) are preset in the cell, the terminal repeatedly sends a random access preamble on each symbol of a physical random access channel (PRACH) slot. The base station receives the random access preamble on 11 symbols of the PRACH slot through polling, and receives the random access preamble on each symbol by using one beam. In this case, a beam polling pattern is shown in FIG. 3.

Assuming that 24 beams (single polarization) are preset in the cell, the terminal repeatedly sends a random access preamble on each symbol of a PRACH slot. The base station receives the random access preamble on 11 symbols of the PRACH slot through polling, and receives the random access preamble on each symbol by using one beam. In this case, a beam polling pattern is shown in FIG. 4.

Assuming that 56 beams (single polarization) are preset in the cell, the terminal repeatedly sends a random access preamble on each symbol of a PRACH slot. The base station receives the random access preamble on 11 symbols of the PRACH slot through polling, and receives the random access preamble on each symbol by using two beams. In this case, a beam polling pattern is shown in FIG. 5.

Assuming that 24 beams (single polarization) are preset in the cell, the terminal repeatedly sends a random access preamble on every two symbols of a PRACH slot. The base station receives the random access preamble on 10 symbols of the PRACH slot through polling, and receives the random access preamble on each symbol by using two beams. In this case, a beam polling pattern is shown in FIG. 6.

Because a time at which the terminal initiates random access and a location of the terminal are random, an additional random access latency is introduced due to beam polling. For example, as shown in FIG. 3, assuming that the terminal is in a coverage area of a beam 11, and the terminal initiates random access starting from a PRACH slot #0, a random access latency introduced by beam polling is a time interval between the PRACH slot #0 and a PRACH slot #1, that is, a PRACH slot period. A typical value of the PRACH slot period is an integer multiple of 10 ms.

SUMMARY

Embodiments of the present invention provide a random access method, apparatus, and device. A sweeping parameter of a receive beam is adjusted based on cell historical information and/or cell handover information, so that when a base station performs receive beam sweeping for receiving a random access preamble, a random access latency introduced by beam sweeping is shortened.

According to a first aspect, an embodiment of the present invention provides a random access method, including: adjusting a sweeping parameter of a receive beam when at least one target receive beam is determined based on prior information, where the prior information includes cell historical information and/or cell handover information; the sweeping parameter includes at least one of the following: a sweeping frequency, a sweeping sequence, a beam direction, and a beam width; the receive beam includes the at least one target receive beam; and the receive beam is used to receive a random access preamble sent by a terminal, so that after a base station receives, on the receive beam, the random access preamble sent by the terminal, the terminal randomly accesses the base station for data communication; and
sweeping the receive beam based on an adjusted sweeping parameter.

During implementation of this embodiment of the present invention, the sweeping parameter of the receive beam may be adjusted based on the cell historical information and/or the cell handover information, to shorten a random access latency introduced by beam sweeping, and improve user experience.

With reference to the first aspect, in a first implementation of the first aspect, the prior information includes the cell historical information; and
the target receive beam includes a beam on which a quantity of random access times obtained through statistics collection based on the cell historical information exceeds a first threshold; or the target receive beam includes a beam on which a ratio of a quantity of random access times obtained through statistics collection based on the cell historical information to a quantity of random access times on all beams exceeds a second threshold; or the target receive beam includes a beam on which a quantity of scheduling times obtained through statistics collection based on the cell historical information exceeds a third threshold; or the target receive beam includes a beam on which a ratio of a quantity of scheduling times obtained through statistics collection based on the cell historical information to a quantity of scheduling times on all beams exceeds a fourth threshold; or the target receive beam includes a beam on which a quantity of online users obtained through statistics collection based on the cell historical information exceeds a fifth threshold; or the target receive beam includes a beam on which a ratio of a quantity of online users obtained through statistics collection based on the cell historical information to a quantity of online users on all beams exceeds a sixth threshold.

This embodiment of the present invention provides a plurality of manners of determining the target receive beam based on the cell historical information, so that after determining the target beam, the base station adjusts the sweeping parameter of the receive beam, to shorten the random access latency introduced by beam sweeping, and improve user experience.

With reference to the first aspect, in a second implementation of the first aspect, when the terminal is handed over from a neighboring cell to a target cell, the prior information includes the cell handover information, the cell handover information includes information about a neighboring cell receive beam, the target receive beam includes the neighboring cell receive beam, and the neighboring cell receive beam is a beam used by the terminal in the neighboring cell to perform data communication with a base station to which the neighboring cell belongs.

This embodiment of the present invention provides a manner of determining the target receive beam based on the cell handover information. When the terminal is handed over from the neighboring cell to the target cell, the neighboring cell receive beam of the terminal is used as the target receive beam, so that the base station adjusts the sweeping parameter of the receive beam, to shorten the random access latency introduced by beam sweeping, and improve user experience.

With reference to the first aspect, in a third implementation of the first aspect, when the terminal is handed over from a neighboring cell to a target cell, the prior information includes the cell handover information and the cell historical information, and the cell historical information is historical information of the target cell; and the target receive beam includes a neighboring cell receive beam and a beam on which a quantity of random access times obtained through statistics collection based on the cell historical information exceeds a first threshold; or the target receive beam includes a neighboring cell receive beam and a beam on which a ratio of a quantity of random access times obtained through statistics collection based on the cell historical information to a quantity of random access times on all beams exceeds a second threshold; or the target receive beam includes a neighboring cell receive beam and a beam on which a quantity of scheduling times obtained through statistics collection based on the cell historical information exceeds a third threshold; or the target receive beam includes a neighboring cell receive beam and a beam on which a ratio of a quantity of scheduling times obtained through statistics collection based on the cell historical information to a quantity of scheduling times on all beams exceeds a fourth threshold; or the target receive beam includes a neighboring cell receive beam and a beam on which a quantity of online users obtained through statistics collection based on the cell historical information exceeds a fifth threshold; or the target receive beam includes a neighboring cell receive beam and a beam on which a ratio of a quantity of online users obtained through statistics collection based on the cell historical information to a quantity of online users on all beams exceeds a sixth threshold.

This embodiment of the present invention provides a plurality of manners of determining the target receive beam based on the cell handover information and the cell historical information, so that after determining the target beam, the base station adjusts the sweeping parameter of the receive beam, to shorten the random access latency introduced by beam sweeping, and improve user experience.

With reference to any one of the first aspect, or the first to the third implementations of the first aspect, in a fourth implementation, the adjusting a sweeping parameter of a receive beam includes at least one of the following: increasing a sweeping frequency of the at least one target receive beam, preferably sweeping the at least one target receive beam, adding a target receive beam in a new beam direction, and adding a target receive beam with a new beam width.

This embodiment of the present invention specifically describes a sweeping parameter adjustment manner. At least one manner of increasing the sweeping frequency of the target receive beam, preferably sweeping the at least one target receive beam, adding the target receive beam in the new beam direction, and adding the target receive beam with the new beam width is used to shorten the random access latency introduced by beam sweeping, and improve user experience.

With reference to the first or the third implementation of the first aspect, in a fifth implementation of the first aspect, the receive beam further includes a non-target receive beam; and a ratio of a sweeping frequency of the target receive beam to a sweeping frequency of the non-target receive beam is directly proportional to a ratio of a quantity of random access times on the target receive beam to a quantity of random access times on the non-target receive beam; or a ratio of a sweeping frequency of the target receive beam to a sweeping frequency of the non-target receive beam is directly proportional to a ratio of a quantity of scheduling times on the target receive beam to a quantity of scheduling times on the non-target receive beam; or a ratio of a sweeping frequency of the target receive beam to a sweeping frequency of the non-target receive beam is directly proportional to a ratio of a quantity of online users on the target receive beam to a quantity of online users on the non-target receive beam.

This embodiment of the present invention specifically describes how to adjust the sweeping parameter of the receive beam based on the cell historical information, to shorten the random access latency introduced by beam sweeping, and improve user experience.

With reference to the second or the third implementation of the first aspect, in a sixth implementation of the first aspect, the sweeping parameter further includes a list of preferably swept beams, and the list of preferably swept beams is used to store at least one piece of information, about a neighboring cell receive beam, that is sent by the terminal to the base station, so that the base station adjusts the sweeping parameter of the receive beam based on the information about the neighboring cell receive beam; and before the adjusting a sweeping parameter of a receive beam when at least one target receive beam is determined based on prior information, the method further includes: receiving information, about a neighboring cell receive beam, that is sent by the terminal, where the list of preferably swept beams includes the information about the neighboring cell receive beam.

This embodiment of the present invention describes: in a cell handover scenario, a neighboring cell receive beam of each terminal is added to the list of preferably swept beams, so that the base station preferably sweeps the neighboring cell receive beam, to shorten the random access latency introduced by beam sweeping, and improve user experience.

With reference to the sixth implementation of the first aspect, in a seventh implementation of the first aspect, if the random access preamble sent by the terminal is received by using the neighboring cell receive beam, the list of preferably swept beams does not include the information about the neighboring cell receive beam.

In this embodiment of the present invention, after random access succeeds by using the neighboring cell receive beam, the neighboring cell receive beam is deleted from the list of preferably swept beams, to shorten a random access latency of another terminal, and improve user experience.

With reference to the sixth implementation of the first aspect, in an eighth implementation of the first aspect, the sweeping parameter further includes information about a timer, and the information about the timer is used: when the timer expires, if the random access preamble sent by the terminal is not received by using the neighboring cell receive beam, the list of preferably swept beams does not include the information about the neighboring cell receive beam.

In this embodiment of the present invention, the timer is set, to ensure validity of the neighboring cell receive beam. If access fails within timing duration of the timer, the neighboring cell receive beam is deleted from the list of preferably swept beams, to shorten a random access latency introduced by sweeping of the neighboring cell receive beam, and improve user experience.

According to a second aspect, an embodiment of the present invention provides a random access apparatus, including:

a determining module, configured to determine at least one target receive beam based on prior information, where the prior information includes cell historical information and/or cell handover information;

an adjustment module, configured to adjust a sweeping parameter of a target receive beam, where the sweeping parameter includes at least one of the following: a sweeping frequency, a sweeping sequence, a beam direction, and a beam width; the receive beam includes the at least one target receive beam; and the receive beam is used to receive a random access preamble sent by a terminal, so that after a base station receives, on the receive beam, the random access preamble sent by the terminal, the terminal randomly accesses the base station for data communication; and a sweeping module, configured to sweep the receive beam based on an adjusted sweeping parameter.

With reference to the second aspect, in a first implementation of the second aspect, the prior information includes the cell historical information; and the target receive beam includes a beam on which a quantity of random access times obtained through statistics collection based on the cell historical information exceeds a first threshold; or the target receive beam includes a beam on which a ratio of a quantity of random access times obtained through statistics collection based on the cell historical information to a quantity of random access times on all beams exceeds a second threshold; or the target receive beam includes a beam on which a quantity of scheduling times obtained through statistics collection based on the cell historical information exceeds a third threshold; or the target receive beam includes a beam on which a ratio of a quantity of scheduling times obtained through statistics collection based on the cell historical information to a quantity of scheduling times on all beams exceeds a fourth threshold; or the target receive beam includes a beam on which a quantity of online users obtained through statistics collection based on the cell historical information exceeds a fifth threshold; or the target receive beam includes a beam on which a ratio of a quantity of online users obtained through statistics collection based on the cell historical information to a quantity of online users on all beams exceeds a sixth threshold.

With reference to the second aspect, in a second implementation of the second aspect, when the terminal is handed over from a neighboring cell to a target cell, the prior information includes the cell handover information, the cell handover information includes information about a neighboring cell receive beam, the target receive beam includes the neighboring cell receive beam, and the neighboring cell receive beam is a beam used by the terminal in the neighboring cell to perform data communication with a base station to which the neighboring cell belongs.

With reference to the second aspect, in a third implementation of the second aspect, when the terminal is handed over from a neighboring cell to a target cell, the prior information includes the cell handover information and the cell historical information, and the cell historical information is historical information of the target cell; and the target receive beam includes a neighboring cell receive beam and a beam on which a quantity of random access times obtained through statistics collection based on the cell historical information exceeds a first threshold; or the target receive beam includes a neighboring cell receive beam and a beam on which a ratio of a quantity of random access times obtained through statistics collection based on the cell historical information to a quantity of random access times on all beams exceeds a second threshold; or the target receive beam includes a neighboring cell receive beam and a beam on which a quantity of scheduling times obtained through statistics collection based on the cell historical information exceeds a third threshold; or the target receive beam includes a neighboring cell receive beam and a beam on which a ratio of a quantity of scheduling times obtained through statistics collection based on the cell historical information to a quantity of scheduling times on all beams exceeds a fourth threshold; or the target receive beam includes a neighboring cell receive beam and a beam on which a quantity of online users obtained through statistics collection based on the cell historical information exceeds a fifth threshold; or the target receive beam includes a neighboring cell receive beam and a beam on which a ratio of a quantity of online users obtained through statistics collection based on the cell historical information to a quantity of online users on all beams exceeds a sixth threshold.

With reference to any one of the second aspect, or the first to the third implementations of the second aspect, in a fourth implementation of the second aspect, the adjustment module is configured to perform at least one of the following: increasing a sweeping frequency of the at least one target receive beam, preferably sweeping the at least one target receive beam, adding a target receive beam in a new beam direction, and adding a target receive beam with a new beam width.

With reference to the first or the third implementation of the second aspect, in a fifth implementation of the second aspect, the receive beam further includes a non-target receive beam; and a ratio of a sweeping frequency of the target receive beam to a sweeping frequency of the non-target receive beam is directly proportional to a ratio of a quantity of random access times on the target receive beam to a quantity of random access times on the non-target receive beam; or a ratio of a sweeping frequency of the target receive beam to a sweeping frequency of the non-target receive beam is directly proportional to a ratio of a quantity of scheduling times on the target receive beam to a quantity of scheduling times on the non-target receive beam; or a ratio of a sweeping frequency of the target receive beam to a sweeping frequency of the non-target receive beam is directly proportional to a ratio of a quantity of online users on the target receive beam to a quantity of online users on the non-target receive beam.

With reference to the second or the third implementation of the second aspect, in a sixth implementation of the second aspect, the sweeping parameter further includes a list of preferably swept beams, and the list of preferably swept beams is used to store at least one piece of information, about a neighboring cell receive beam, that is sent by the terminal to the base station, so that the base station adjusts the sweeping parameter of the receive beam based on the information about the neighboring cell receive beam; and the apparatus further includes a receiving module, configured to: before the determining module determines the at least one target receive beam based on the prior information, receive the information, about the neighboring cell receive beam, that is sent by the terminal.

With reference to the sixth implementation of the second aspect, in a seventh implementation of the second aspect, if the random access preamble sent by the terminal is received by using the neighboring cell receive beam, the list of preferably swept beams does not include the information about the neighboring cell receive beam.

With reference to the sixth implementation of the second aspect, in an eighth implementation of the second aspect, the sweeping parameter further includes information about a timer, and the information about the timer is used: when the timer expires, if the random access preamble sent by the terminal is not received by using the neighboring cell receive beam, the list of preferably swept beams does not include the information about the neighboring cell receive beam.

According to a third aspect, an embodiment of the present invention provides a random access device, including:

a memory, configured to store a program instruction;

a processor, configured to invoke the program instruction stored in the memory, to perform the following operations:

adjusting a sweeping parameter of at least one target receive beam when at least one target receive beam is determined based on prior information, where the prior information includes cell historical information and/or cell handover information; the sweeping parameter includes at least one of the following: a sweeping frequency, a sweeping sequence, a beam direction, and a beam width; the receive beam includes the at least one target receive beam; and the receive beam is used to receive a random access preamble sent by a terminal, so that after a base station receives, on the receive beam, the random access preamble sent by the terminal, the terminal randomly accesses the base station for data communication; and sweeping the receive beam based on an adjusted sweeping parameter.

With reference to the third aspect, in a first implementation of the third aspect, the prior information includes the cell historical information; and the target receive beam includes a beam on which a quantity of random access times obtained through statistics collection based on the cell historical information exceeds a first threshold; or the target receive beam includes a beam on which a ratio of a quantity of random access times obtained through statistics collection based on the cell historical information to a quantity of random access times on all beams exceeds a second threshold; or the target receive beam includes a beam on which a quantity of scheduling times obtained through statistics collection based on the cell historical information exceeds a third threshold; or the target receive beam includes a beam on which a ratio of a quantity of scheduling times obtained through statistics collection based on the cell historical information to a quantity of scheduling times on all beams exceeds a fourth threshold; or the target receive beam includes a beam on which a quantity of online users obtained through statistics collection based on the cell historical information exceeds a fifth threshold; or the target receive beam includes a beam on which a ratio of a quantity of online users obtained through statistics collection based on the cell historical information to a quantity of online users on all beams exceeds a sixth threshold.

With reference to the third aspect, in a second implementation of the third aspect, when the terminal is handed over from a neighboring cell to a target cell, the prior information includes the cell handover information, the cell handover information includes information about a neighboring cell receive beam, the target receive beam includes the neighboring cell receive beam, and the neighboring cell receive beam is a beam used by the terminal in the neighboring cell to perform data communication with a base station to which the neighboring cell belongs.

With reference to the third aspect, in a third implementation of the third aspect, when the terminal is handed over from a neighboring cell to a target cell, the prior information includes the cell handover information and the cell historical information, and the cell historical information is historical information of the target cell; and the target receive beam includes a neighboring cell receive beam and a beam on which a quantity of random access times obtained through statistics collection based on the cell historical information exceeds a first threshold; or the target receive beam includes a neighboring cell receive beam and a beam on which a ratio of a quantity of random access times obtained through statistics collection based on the cell historical information to a quantity of random access times on all beams exceeds a second threshold; or the target receive beam includes a neighboring cell receive beam and a beam on which a quantity of scheduling times obtained through statistics collection based on the cell historical information exceeds a third threshold; or the target receive beam includes a neighboring cell receive beam and a beam on which a ratio of a quantity of scheduling times obtained through statistics collection based on the cell historical information to a quantity of scheduling times on all beams exceeds a fourth threshold; or the target receive beam includes a neighboring cell receive beam and a beam on which a quantity of online users obtained through statistics collection based on the cell historical information exceeds a fifth threshold; or the target receive beam includes a neighboring cell receive beam and a beam on which a ratio of a quantity of online users obtained through statistics collection based on the cell historical information to a quantity of online users on all beams exceeds a sixth threshold.

With reference to any one of the third aspect, or the first to the third implementations of the third aspect, in a fourth implementation of the third aspect, that the processor adjusts a sweeping parameter of a receive beam includes at least one of the following: increasing a sweeping frequency of the at least one target receive beam, preferably sweeping the at least one target receive beam, adding a target receive beam in a new beam direction, and adding a target receive beam with a new beam width.

With reference to the first or the third implementation of the third aspect, in a fifth implementation of the third aspect, the receive beam further includes a non-target receive beam; and a ratio of a sweeping frequency of the target receive beam to a sweeping frequency of the non-target receive beam is directly proportional to a ratio of a quantity of random access times on the target receive beam to a quantity of random access times on the non-target receive beam; or a ratio of a sweeping frequency of the target receive beam to a sweeping frequency of the non-target receive beam is directly proportional to a ratio of a quantity of scheduling times on the target receive beam to a quantity of scheduling times on the non-target receive beam; or a ratio of a sweeping frequency of the target receive beam to a sweeping frequency of the non-target receive beam is directly proportional to a ratio of a quantity of online users on the target receive beam to a quantity of online users on the non-target receive beam.

With reference to the second or the third implementation of the third aspect, in a sixth implementation of the third aspect, the sweeping parameter further includes a list of preferably swept beams, and the list of preferably swept beams is used to store at least one piece of information, about a neighboring cell receive beam, that is sent by the terminal to the base station, so that the base station adjusts the sweeping parameter of the receive beam based on the information about the neighboring cell receive beam; and the processor is further configured to: before determining the at least one target receive beam based on the prior information, receive the information, about the neighboring cell receive beam, that is sent by the terminal.

With reference to the sixth implementation of the third aspect, in a seventh implementation of the third aspect, if the random access preamble sent by the terminal is received by using the neighboring cell receive beam, the list of preferably swept beams does not include the information about the neighboring cell receive beam.

With reference to the sixth implementation of the third aspect, in an eighth implementation of the third aspect, the sweeping parameter further includes information about a timer, and the information about the timer is used: when the timer expires, if the random access preamble sent by the terminal is not received by using the neighboring cell receive beam, the list of preferably swept beams does not include the information about the neighboring cell receive beam.

According to a fourth aspect, an embodiment of the present invention provides a computer readable storage medium, configured to store one or more computer programs. The one or more computer programs include an instruction, and when the computer program is run on a computer, the instruction is used to perform the random access method provided in any one of the first aspect or the implementations of the first aspect.

According to a fifth aspect, an embodiment of the present invention provides a computer program. The computer program includes an instruction, and when the computer program is run on a computer, the instruction is used to perform the random access method provided in any one of the first aspect or the implementations of the first aspect.

It can be learned that, the embodiments of the present invention provide a random access method, apparatus, and device, the sweeping parameter of the receive beam may be adjusted based on the cell historical information and/or the cell handover information. Specifically, at least one of the following manners may be included: increasing the sweeping frequency of the at least one target receive beam, preferably sweeping the at least one target receive beam, adding the target receive beam in the new beam direction, and adding the target receive beam with the new beam width. This resolves a technical problem in the prior art that a random access latency is introduced by receive beam polling, effectively shortens the random access latency introduced by beam sweeping, and improves user experience.

BRIEF DESCRIPTION OF DRAWINGS

To describe the technical solutions in the embodiments of this application or in the prior art more clearly, the following briefly describes the accompanying drawings required for describing the embodiments or the prior art.

FIG. 3 is a schematic diagram of receive beam polling for a random access preamble in the prior art;

FIG. 4 is another schematic diagram of receive beam polling for a random access preamble in the prior art;

FIG. 5 is another schematic diagram of receive beam polling for a random access preamble in the prior art;

FIG. 10 is another schematic diagram of receive beam polling for a random access preamble according to an embodiment of the present invention;

FIG. 11 is another schematic diagram of receive beam polling for a random access preamble according to an embodiment of the present invention;

FIG. 12 is another schematic diagram of receive beam polling for a random access preamble according to an embodiment of the present invention;

FIG. 14 is another schematic diagram of receive beam polling for a random access preamble according to an embodiment of the present invention;

FIG. 15 is another schematic diagram of receive beam polling for a random access preamble according to an embodiment of the present invention;

DESCRIPTION OF EMBODIMENTS

The following clearly and completely describes the technical solutions in the embodiments of the present invention with reference to the accompanying drawings in the embodiments of the present invention.

In the specification, claims, and accompanying drawings of the present invention, the terms "first", "second", "third", and the likes are intended to distinguish between different objects but do not indicate a particular order. In addition, the terms "including", "having", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
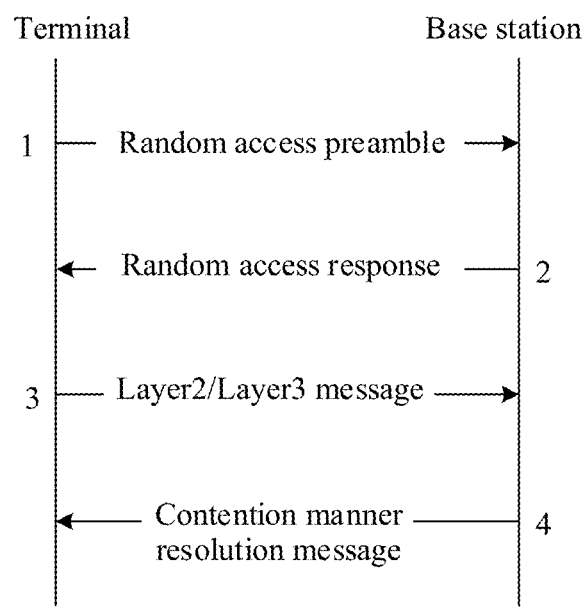
FIG. 1 is a schematic diagram of a contention-based random access procedure in the prior art.
Figure 2:
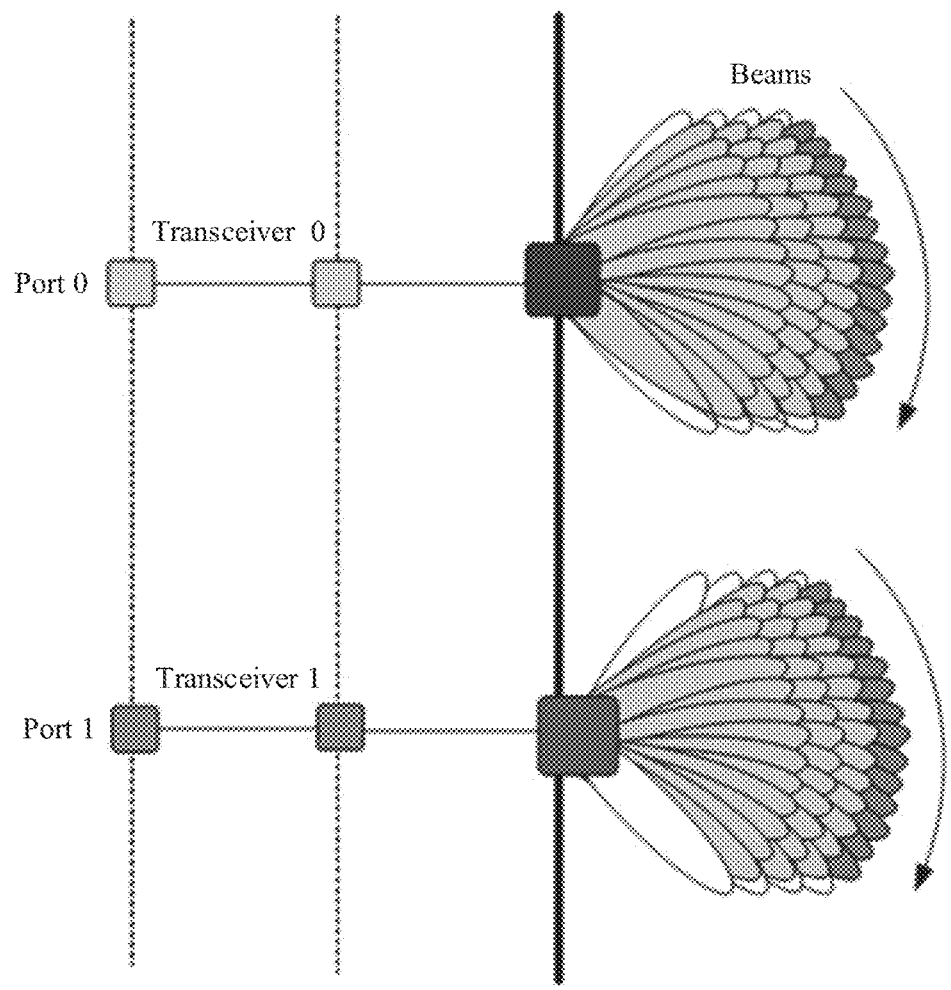
FIG. 2 is a schematic diagram of cell beams in a hybrid beamforming architecture.
Figures 6, 7:
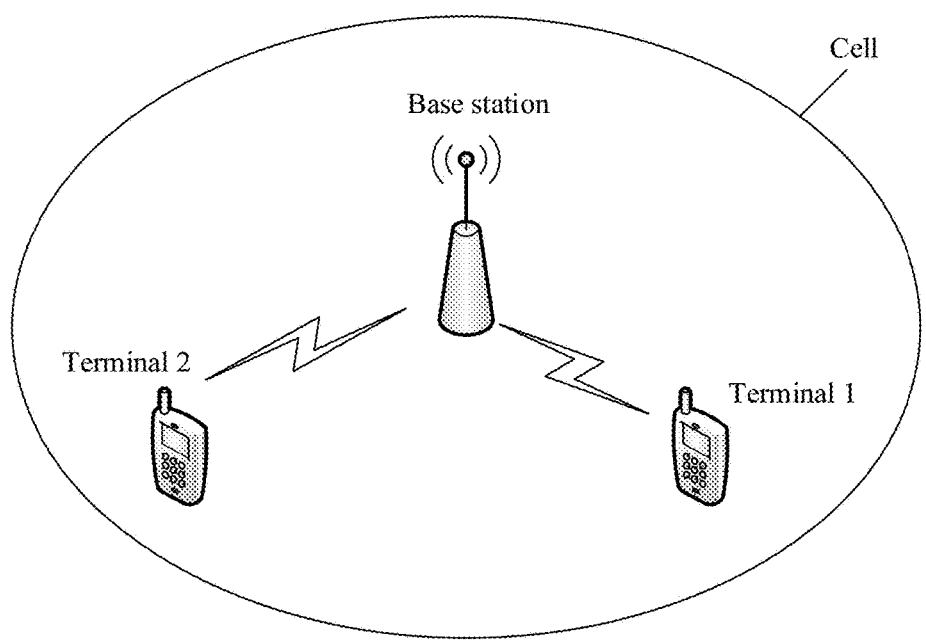
FIG. 6 is another schematic diagram of receive beam polling for a random access preamble in the prior art.
FIG. 7 is a schematic diagram of a network architecture of a random access system according to an embodiment of the present invention.

FIG. 7 is a schematic diagram of a network architecture of a random access system according to an embodiment of the present invention.

As shown in FIG. 7, the random access system includes a base station and at least one terminal. The terminal is located in a cell covered by the base station. The terminal may send, to the base station, a random access preamble for requesting access, and the base station performs receive beam sweeping for the random access preamble. After the base station successfully receives, on a beam, the random access preamble sent by the terminal, the terminal can successfully access the base station for data communication.

The base station may be but is not limited to a 5G NodeB (gNB), a new radio eNB, a transmission and reception point (TRP), a macro base station, a micro base station, a high frequency base station, and the like.

The terminal may be but is not limited to a mobile phone, a mobile computer, a tablet computer, a personal digital assistant (PDA), a smart watch, smart glasses, a smart band, a smart car, a sensing device, an internet of things (IoT) device, and customer premise equipment (CPE), a relay base station, and the like.

The following describes prior information and a target receive beam determined based on the prior information in the embodiments of the present invention.

Specifically, the prior information may include cell historical information and/or cell handover information.

Specifically, the cell historical information may be a quantity of random access times, a quantity of scheduling times, or a quantity of online users obtained through statistics collection on each receive beam in a past time period. The time period may be but is not limited to one month, one week, one day, one hour, or the like.

Specifically, the cell historical information may be the quantity of random access times, the quantity of scheduling times, or the quantity of online users obtained through statistics collection on each receive beam in the past time period.

I. The prior information includes the cell historical information.

1. The cell historical information includes a quantity of random access times on each beam, and the target receive beam includes a beam on which a quantity of random access times obtained through statistics collection based on the cell historical information exceeds a first threshold. The first threshold is related to duration during which statistics collection is performed on the cell historical information. For example, when the cell historical information is a quantity of random access times on each beam in the last month, for example, the first threshold may be but is not limited to 500, 800, 1000, or the like. When the cell historical information is a quantity of random access times on each beam in the last week, for example, the first threshold may be but is not limited to 100, 200, 500, or the like. A value of the first threshold herein is merely an example for description. In specific implementation, the first threshold may further be set to another value. This should not constitute a limitation on the present invention. It may be learned that the value of the first threshold may be but is not limited to a running parameter configured by an operator for a base station.

2. The cell historical information includes a quantity of random access times on each beam, and the target receive beam includes a beam on which a ratio of a quantity of random access times obtained through statistics collection based on the cell historical information to a quantity of random access times on all beams exceeds a second threshold. The second threshold may not be related to duration during which statistics collection is performed on the cell historical information. For example, the second threshold may be but is not limited to 30%, 50%, or the like. A value of the second threshold herein is merely an example for description. In specific implementation, the second threshold may be set to another value. This should not constitute a limitation on the present invention. It may be learned that the value of the second threshold may be but is not limited to a running parameter configured by an operator for a base station.

For example, it is assumed that, based on historical information of a cell in the last day, a quantity of random access times on a beam 0 is 20, a quantity of random access times on a beam 1 is 30, a quantity of random access times on a beam 2 is 50, a quantity of random access times on a beam 3 is 15, and so on. A quantity of random access times on all the beams is 150, and the second threshold is 30%. In this case, ratios of the quantities of random access times on the beam 0 to the beam 3 to the quantity of random access times on all the beams are respectively 17%, 20%, 33%, and 10%. In this case, the beam on which the ratio exceeds the second threshold is the beam 2, and the beam 2 may be used as the target receive beam.

3. The cell historical information includes a quantity of scheduling times on each beam, and the target receive beam includes a beam on which a quantity of scheduling times obtained through statistics collection based on the cell historical information exceeds a third threshold. The third threshold is related to duration during which statistics collection is performed on the cell historical information. For example, when the cell historical information is a quantity of scheduling times on each beam in the last month, for example, the third threshold may be but is not limited to 500, 800, 1000, or the like. When the cell historical information is a quantity of scheduling times on each beam in the last week, for example, the third threshold may be but is not limited to 100, 200, 500, or the like. A value of the third threshold herein is merely an example for description. In specific implementation, the third threshold may be set to another value. This should not constitute a limitation on the present invention. It may be learned that the value of the third threshold may be but is not limited to a running parameter configured by an operator for a base station.

4. The cell historical information includes a quantity of scheduling times on each beam, and the target receive beam includes a beam on which a ratio of a quantity of scheduling times obtained through statistics collection based on the cell historical information to a quantity of scheduling times on all beams exceeds a fourth threshold. The fourth threshold may not be related to duration during which statistics collection is performed on the cell historical information. For example, the fourth threshold may be but is not limited to 30%, 50%, or the like. A value of the fourth threshold herein is merely an example for description. In specific implementation, the fourth threshold may be set to another value. This should not constitute a limitation on the present invention. It may be learned that the value of the fourth threshold may be but is not limited to a running parameter configured by an operator for a base station.

For example, it is assumed that, based on historical information of a cell in the last day, a quantity of scheduling times on a beam 0 is 20, a quantity of scheduling times on a beam 1 is 30, a quantity of scheduling times on a beam 2 is 50, a quantity of scheduling times on a beam 3 is 15, and so on. A quantity of scheduling times on all the beams is 150, and the fourth threshold is 30%. In this case, ratios of the quantities of scheduling times on the beam 0 to the beam 3 to the quantity of scheduling times on all the beams are respectively 17%, 20%, 33%, and 10%. In this case, the beam on which the ratio exceeds the fourth threshold is the beam 2, and the beam 2 may be used as the target receive beam.

5. The cell historical information includes a quantity of online users on each beam, and the target receive beam includes a beam on which a quantity of online users obtained through statistics collection based on the cell historical information exceeds a fifth threshold. The fifth threshold is related to duration during which statistics collection is performed on the cell historical information. For example, when the cell historical information is a quantity of online users on each beam in the last month, for example, the fifth threshold may be but is not limited to 500, 800, 1000, or the like. When the cell historical information is a quantity of online users on each beam in the last week, for example, the fifth threshold may be but is not limited to 100, 200, 500, or the like. A value of the fifth threshold herein is merely an example for description. In specific implementation, the fifth threshold may be set to another value. This should not constitute a limitation on the present invention. It may be learned that the value of the fifth threshold may be but is not limited to a running parameter configured by an operator for a base station.

6. The cell historical information includes a quantity of online users on each beam, and the target receive beam includes a beam on which a ratio of a quantity of online users obtained through statistics collection based on the cell historical information to a quantity of online users on all beams exceeds a sixth threshold. The sixth threshold may not be related to duration during which statistics collection is performed on the cell historical information. For example, the sixth threshold may be but is not limited to 30%, 50%, or the like. A value of the sixth threshold herein is merely an example for description. In specific implementation, the sixth threshold may be set to another value. This should not constitute a limitation on the present invention. It may be learned that the value of the sixth threshold may be but is not limited to a running parameter configured by an operator for a base station.

For example, it is assumed that, based on historical information of a cell in the last day, a quantity of online users on a beam 0 is 20, a quantity of online users on a beam 1 is 30, a quantity of online users on a beam 2 is 50, a quantity of online users on a beam 3 is 15, and so on. A quantity of online users on all the beams is 150, and the sixth threshold is 30%. In this case, ratios of the quantities of online users on the beam 0 to the beam 3 to the quantity of online users on all the beams are respectively 17%, 20%, 33%, and 10%. In this case, the beam on which the ratio exceeds the sixth threshold is the beam 2, and the beam 2 may be used as the target receive beam.

It may be learned that if the cell historical information includes at least two indicators of the quantity of random access times, the quantity of scheduling times, and the quantity of online users on each beam, the target receive beam includes a beam on which at least two indicators obtained through statistics collection based on the cell historical information exceed respective corresponding thresholds.

For example, it is assumed that the cell historical information includes two indicators: the quantity of random access times and the quantity of scheduling times on each beam, the quantity of random access times corresponds to a seventh threshold, and the quantity of scheduling times corresponds to an eighth threshold. In this case, the target receive beam includes a beam on which a quantity of random access times obtained through statistics collection based on the cell historical information exceeds the seventh threshold, and a quantity of scheduling times exceeds the eighth threshold.

It may be learned that if the prior information includes the cell historical information, and the cell historical information includes at least two indicators of the quantity of random access times, the quantity of scheduling times, and the quantity of online users on each beam, the target receive beam includes a beam on which ratios of at least two indicators obtained through statistics collection based on the cell historical information to at least two indicators on all beams exceed respective corresponding thresholds.

For example, it is assumed that the cell historical information includes two indicators: the quantity of random access times and the quantity of scheduling times on each beam. The quantity of random access times corresponds to a seventh threshold, and the quantity of scheduling times corresponds to an eighth threshold. In this case, the target receive beam includes a beam on which a ratio of a quantity of random access times obtained through statistics collection based on the cell historical information to a quantity of random access times on all beams exceeds the seventh threshold, and a ratio of a quantity of scheduling times to a quantity of scheduling times on all the beams exceeds the eighth threshold.

II. The prior information includes the cell handover information.

Specifically, the cell handover information may be information about a receive beam (referred to as a neighboring cell receive beam below) of a terminal in a neighboring cell when the terminal is handed over from the neighboring cell to a current cell and requests to access a base station in the current cell. That is, the cell handover information includes information about a neighboring cell receive beam. The target receive beam includes the neighboring cell receive beam, and the neighboring cell receive beam is a beam used by the terminal in the neighboring cell to perform data communication with a base station to which the neighboring cell belongs.

For example, it is assumed that a neighboring cell receive beam measured by the terminal is a beam 28, identification information (ID) of the beam 28 is sent to the base station, and the base station uses the beam 28 as the target receive beam.

III. The prior information includes the cell handover information and the cell historical information.

1. The cell historical information includes a quantity of random access times on each beam, and the target receive beam includes a neighboring cell receive beam and a beam on which a quantity of random access times obtained through statistics collection based on the cell historical information exceeds a first threshold. The first threshold is related to duration during which statistics collection is performed on the cell historical information. For example, when the cell historical information is a quantity of random access times on each beam in the last month, for example, the first threshold may be but is not limited to 500, 800, 1000, or the like. When the cell historical information is a quantity of random access times on each beam in the last week, for example, the first threshold may be but is not limited to 100, 200, 500, or the like. A value of the first threshold herein is merely an example for description. In specific implementation, the first threshold may be set to another value. This should not constitute a limitation on the present invention. It may be learned that the value of the first threshold may be but is not limited to a running parameter configured by an operator for a base station.

2. The cell historical information includes a quantity of random access times on each beam, and the target receive beam includes a neighboring cell receive beam and a beam on which a ratio of a quantity of random access times obtained through statistics collection based on the cell historical information to a quantity of random access times on all beams exceeds a second threshold. The second threshold may not be related to duration during which statistics collection is performed on the cell historical information. For example, the second threshold may be but is not limited to 30%, 50%, or the like. A value of the second threshold herein is merely an example for description. In specific implementation, the second threshold may be set to another value. This should not constitute a limitation on the present invention. It may be learned that the value of the second threshold may be but is not limited to a running parameter configured by an operator for a base station.

3. The cell historical information includes a quantity of scheduling times on each beam, and the target receive beam includes a neighboring cell receive beam and a beam on which a quantity of scheduling times obtained through statistics collection based on the cell historical information exceeds a third threshold. The third threshold is related to duration during which statistics collection is performed on the cell historical information. For example, when the cell historical information is a quantity of scheduling times on each beam in the last month, for example, the third threshold may be but is not limited to 500, 800, 1000, or the like. When the cell historical information is a quantity of scheduling times on each beam in the last week, for example, the third threshold may be but is not limited to 100, 200, 500, or the like. A value of the third threshold herein is merely an example for description. In specific implementation, the third threshold may be set to another value. This should not constitute a limitation on the present invention. It may be learned that the value of the third threshold may be but is not limited to a running parameter configured by an operator for a base station.

4. The cell historical information includes a quantity of scheduling times on each beam, and the target receive beam includes a neighboring cell receive beam and a beam on which a ratio of a quantity of random access times obtained through statistics collection based on the cell historical information to a quantity of scheduling times on all beams exceeds a fourth threshold. The fourth threshold may not be related to duration during which statistics collection is performed on the cell historical information. For example, the fourth threshold may be but is not limited to 30%, 50%, or the like. A value of the fourth threshold herein is merely an example for description. In specific implementation, the fourth threshold may be set to another value. This should not constitute a limitation on the present invention. It may be learned that the value of the fourth threshold may be but is not limited to a running parameter configured by an operator for a base station.

5. The cell historical information includes a quantity of online users on each beam, and the target receive beam includes a neighboring cell receive beam and a beam on which a quantity of online users obtained through statistics collection based on the cell historical information exceeds a fifth threshold. The fifth threshold is related to duration during which statistics collection is performed on the cell historical information. For example, when the cell historical information is a quantity of online users on each beam in the last month, for example, the fifth threshold may be but is not limited to 500, 800, 1000, or the like. When the cell historical information is a quantity of online users on each beam in the last week, for example, the fifth threshold may be but is not limited to 100, 200, 500, or the like. A value of the fifth threshold herein is merely an example for description. In specific implementation, the fifth threshold may be set to another value. This should not constitute a limitation on the present invention. It may be learned that the value of the fifth threshold may be but is not limited to a running parameter configured by an operator for a base station.

6. The cell historical information includes a quantity of online users on each beam, and the target receive beam includes a neighboring cell receive beam and a beam on which a ratio of a quantity of online users obtained through statistics collection based on the cell historical information to a quantity of online users on all beams exceeds a sixth threshold. The sixth threshold may not be related to duration during which statistics collection is performed on the cell historical information. For example, the sixth threshold may be but is not limited to 30%, 50%, or the like. A value of the sixth threshold herein is merely an example for description. In specific implementation, the sixth threshold may be set to another value. This should not constitute a limitation on the present invention. It may be learned that the value of the sixth threshold may be but is not limited to a running parameter configured by an operator for a base station.

It may be learned that the cell historical information may alternatively include at least two indicators of the quantity of random access times, the quantity of scheduling times, and the quantity of online users on each beam. In this case, the target receive beam includes a neighboring cell receive beam and a beam on which at least two indicators obtained through statistics collection based on the cell historical information exceed respective corresponding thresholds.

It may be learned that the cell historical information may alternatively include at least two indicators of the quantity of random access times, the quantity of scheduling times, and the quantity of online users on each beam. In this case, the target receive beam includes a neighboring cell receive beam and a beam on which ratios of at least two indicators obtained through statistics collection based on the cell historical information to at least two indicators on all beams exceed respective corresponding thresholds.

Figures 8, 9:
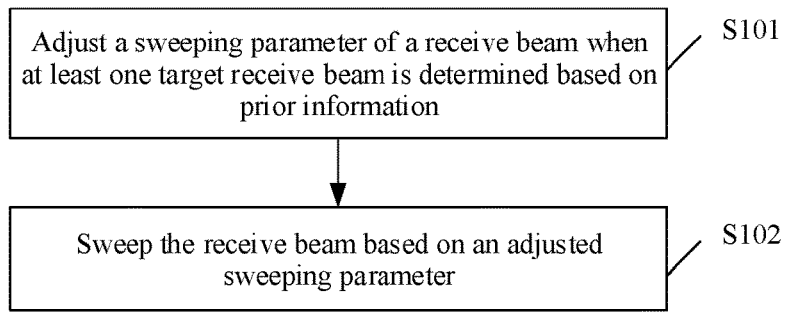
FIG. 8 is a schematic flowchart of a random access method according to an embodiment of the present invention.
FIG. 9 is a schematic diagram of receive beam polling for a random access preamble according to an embodiment of the present invention.

The following describes, with reference to the random access system provided in FIG. 7 and the foregoing explanations of the prior information and the target receive beam determined based on the prior information, a random access method provided in the embodiments of the present invention. As shown in FIG. 8, the random access method may include at least the following steps.

S101. Adjust a sweeping parameter of a receive beam when at least one target receive beam is determined based on prior information.

Specifically, the prior information may include cell historical information and/or cell handover information.

Specifically, for the prior information and the target receive beam determined based on the prior information, refer to the explanations (I, II, and III) of the prior information and the target receive beam determined based on the prior information in the foregoing embodiment. Details are not described herein again.

The cell historical information may be a quantity of random access times, a quantity of scheduling times, or a quantity of online users obtained through statistics collection on each receive beam in a past time period. The time period may be but is not limited to one month, one week, one day, one hour, or the like.

The cell handover information may be information about a receive beam (a neighboring cell receive beam) of a terminal in a neighboring cell when the terminal is handed over from the neighboring cell to a current cell and requests to access a base station in the current cell.

Specifically, the sweeping parameter may include at least one of the following: a sweeping frequency, a sweeping sequence, a beam direction, and a beam width.

The receive beam includes the at least one target receive beam. The receive beam is used to receive a random access preamble sent by the terminal, so that after the base station receives, on a beam of the receive beam, the random access preamble sent by the terminal, the terminal randomly accesses the base station for data communication.

Specifically, the adjusting a sweeping parameter of a receive beam includes at least one of the following: increasing a sweeping frequency of the at least one target receive beam, preferably sweeping the at least one target receive beam, adding a target receive beam in a new beam direction, and adding a target receive beam with a new beam width.

It may be learned that when the target receive beam is determined based on the cell historical information, the receive beam includes not only the target receive beam but also a non-target receive beam, in other words, a beam other than the target receive beam determined based on the prior information in all receive beams.

The sweeping frequency of the receive beam may be specifically adjusted in the following several implementations.

Implementation 1: A ratio of the sweeping frequency of the target receive beam to a sweeping frequency of the non-target receive beam is directly proportional to a ratio of a quantity of random access times on the target receive beam to a quantity of random access times on the non-target receive beam.

Implementation 2: A ratio of the sweeping frequency of the target receive beam to a sweeping frequency of the non-target receive beam is directly proportional to a ratio of a quantity of scheduling times on the target receive beam to a quantity of scheduling times on the non-target receive beam.

Implementation 3: A ratio of the sweeping frequency of the target receive beam to a sweeping frequency of the non-target receive beam is directly proportional to a ratio of a quantity of online users on the target receive beam to a quantity of online users on the non-target receive beam.

With reference to the first to the third implementations of adjusting the sweeping frequency of the target receive beam, for adjustment of the sweeping sequence, the target receive beam may be preferably swept in each slot.

Adjustment in the beam direction may be adding a target receive beam in a new beam direction.

Optionally, when there are at least two adjacent target receive beams in a plurality of target receive beams determined based on the cell historical information, a target receive beam in a new beam direction may be added. The beam direction of the newly added target receive beam may cover beam directions of the at least two adjacent target receive beams. For example, when there are two adjacent beams 3 and 4 in the plurality of target receive beams determined based on the cell historical information, the base station may add a beam A based on the beams 3 and 4, and a beam direction of the beam A may cover beam directions of the beams 3 and 4.

Optionally, in a cell handover scenario, when at least two terminals request access at the same time, if it is determined, based on the cell handover information, that neighboring cell receive beams of the at least two terminals are adjacent, a target receive beam in a new beam direction may be added. The beam direction of the newly added target receive beam may cover directions of the neighboring cell receive beams of the at least two terminals. For example, when it is determined, based on the cell handover information, that a neighboring cell receive beam of a terminal 1 is a beam 8, and a neighboring cell receive beam of a terminal 2 is a beam 9, the base station may add a beam B based on the beams 8 and 9, and a beam direction of the beam B may cover beam directions of the beams 8 and 9.

Specifically, the newly added target receive beam may belong to another group of beams preconfigured for the base station. When the new target receive beam is determined based on the prior information, the new target receive beam may be added to a current receive beam.

Optionally, the newly added target receive beam may alternatively be a beam calculated based on at least two currently adjacent target receive beams. When the new target receive beam is obtained based on the prior information, the new target receive beam may be added to the current receive beam.

Adjustment in the beam width may be adding a target receive beam with a new beam width.

Optionally, when there are at least two adjacent target receive beams in a plurality of target receive beams determined based on the cell historical information, a target receive beam with a new beam width may be added. The beam width of the newly added target receive beam may cover beam widths of the at least two adjacent target receive beams. For example, when there are two adjacent beams 3 and 4 in the plurality of target receive beams determined based on the cell historical information, the base station may add a beam A based on the beams 3 and 4, and a beam width of the beam A may cover beam widths of the beams 3 and 4.

Optionally, in a cell handover scenario, when at least two terminals request access at the same time, if it is determined, based on the cell handover information, that neighboring cell receive beams of the at least two terminals are adjacent, a target receive beam with a new beam width may be added. The beam width of the newly added target receive beam may cover widths of the neighboring cell receive beams of the at least two terminals. For example, when it is determined, based on the cell handover information, that a neighboring cell receive beam of a terminal 1 is a beam 8, and a neighboring cell receive beam of a terminal 2 is a beam 9, the base station may add a beam B based on the beams 8 and 9, and a beam width of the beam B may cover beam widths of the beams 8 and 9.

Specifically, the newly added target receive beam may belong to another group of beams preconfigured for the base station. When the new target receive beam is determined based on the prior information, the new target receive beam may be added to a current receive beam.

Optionally, the newly added target receive beam may alternatively be a beam calculated based on at least two currently adjacent target receive beams. When the new target receive beam is obtained based on the prior information, the new target receive beam may be added to the current receive beam.

In addition, for the added target receive beam in the new beam direction and the added target receive beam with the new beam width, a sweeping frequency and/or a sweeping sequence of the foregoing new target receive beams may be further adjusted. For details of adjustment of the sweeping frequency and/or the sweeping sequence, refer to the foregoing related parts for adjusting the sweeping frequency and the sweeping parameter. Details are not described herein again.

S102. Sweep the receive beam based on an adjusted sweeping parameter.

During implementation of this embodiment of the present invention, the sweeping parameter of the receive beam may be adjusted based on the cell historical information and/or the cell handover information. Specifically, at least one of the following manners may be included: increasing the sweeping frequency of the at least one target receive beam, preferably sweeping the at least one target receive beam, adding a target receive beam in a new beam direction, and adding a target receive beam with a new beam width. This resolves a technical problem in the prior art that a random access latency is introduced by receive beam polling, effectively shortens a random access latency caused by beam sweeping, and improves user experience.

In a specific embodiment, assuming that 56 beams are preset in a cell, a terminal repeatedly sends a random access preamble on each symbol of a PRACH slot. A base station receives the random access preamble on 11 symbols of the PRACH slot through sweeping, and receives the random access preamble on each symbol by using one beam.

It is assumed that quantities of random access times, quantities of scheduling times, or quantities of online users on beams 6, 7, 20, 21, 34, and 35 are significantly greater than those on other beams based on cell historical information (average values of the quantities on the beams 6, 7, 20, 21, 34, and 35 each are twice those on the other beams). The beams 6, 7, 20, 21, 34, and 35 are used as target receive beams and are grouped into one group, and a sweeping period is three PRACH slot periods. The other beams are used as non-target receive beams and are grouped into one group, and a sweeping period is five or six PRACH slot periods. A beam sweeping pattern is shown in FIG. 9. Beams indicated by horizontal stripes are the target receive beams determined based on the cell historical information.

In another specific embodiment, assuming that 24 beams are preset in a cell, a terminal repeatedly sends a random access preamble on each symbol of a PRACH slot. A base station receives the random access preamble on 11 symbols of the PRACH slot through polling, and receives the random access preamble on each symbol by using one beam.

It is assumed that quantities of random access times, quantities of scheduling times, or quantities of online users on beams 3, 4, 5, 11, 12, 13, 19, 20, and 21 are significantly greater than those on other beams based on cell historical information (average values of the quantities on the beams 3, 4, 5, 11, 12, 13, 19, 20, and 21 each are twice those on the other beams). The beams 3, 4, 5, 11, 12, 13, 19, 20, and 21 are used as target receive beams and are grouped into one group, and a sweeping period is 1.5 PRACH slot periods. The other beams are used as non-target receive beams and are grouped into one group, and a sweeping period is three PRACH slot periods. A beam sweeping pattern is shown in FIG. 10. Beams indicated by horizontal stripes are the target receive beams determined based on the cell historical information.

In another specific embodiment, assuming that 56 beams are preset in a cell, a terminal repeatedly sends a random access preamble on each symbol of a PRACH slot. A base station receives the random access preamble on 11 symbols of the PRACH slot through sweeping, and receives the random access preamble on each symbol by using one beam.

It is assumed that quantities of random access times, quantities of scheduling times, or quantities of online users on beams 6, 7, 20, 21, 34, 35, 48, and 49 are significantly greater than those on other beams based on cell historical information (average values of the quantities on the beams 6, 7, 20, 21, 34, 35, 48, and 49 each are six times those on the other beams). The beams 6, 7, 20, 21, 34, 35, 48, and 49 are used as target receive beams and are grouped into one group, and a sweeping period is one PRACH slot period. The other beams are used as non-target receive beams and are grouped into one group, and a sweeping period is three or four PRACH slot periods. A beam sweeping pattern is shown in FIG. 11. Beams indicated by horizontal stripes are the target receive beams determined based on the cell historical information.

In another specific embodiment, assuming that 24 beams are preset in a cell, a terminal repeatedly sends a random access preamble on every two symbols of a PRACH slot. A base station receives the random access preamble on 10 symbols of the PRACH slot through polling, and receives the random access preamble on each symbol by using two beams.

It is assumed that quantities of random access times, quantities of scheduling times, or quantities of online users on beams 3, 4, 11, 12, 19, and 20 are significantly greater than those on other beams based on cell historical information (average values of the quantities on the beams 3, 4, 11, 12, 19, and 20 each are twice those on the other beams). The beams 3, 4, 11, 12, 19, and 20 are used as target receive beams and are grouped into one group, and a sweeping period is 1.5 PRACH slot periods. The other beams are used as non-target receive beams and are grouped into one group, and a sweeping period is three PRACH slot periods. A beam sweeping pattern is shown in FIG. 12. Beams indicated by horizontal stripes are target receive beams determined based on the cell historical information.

Figure 13:
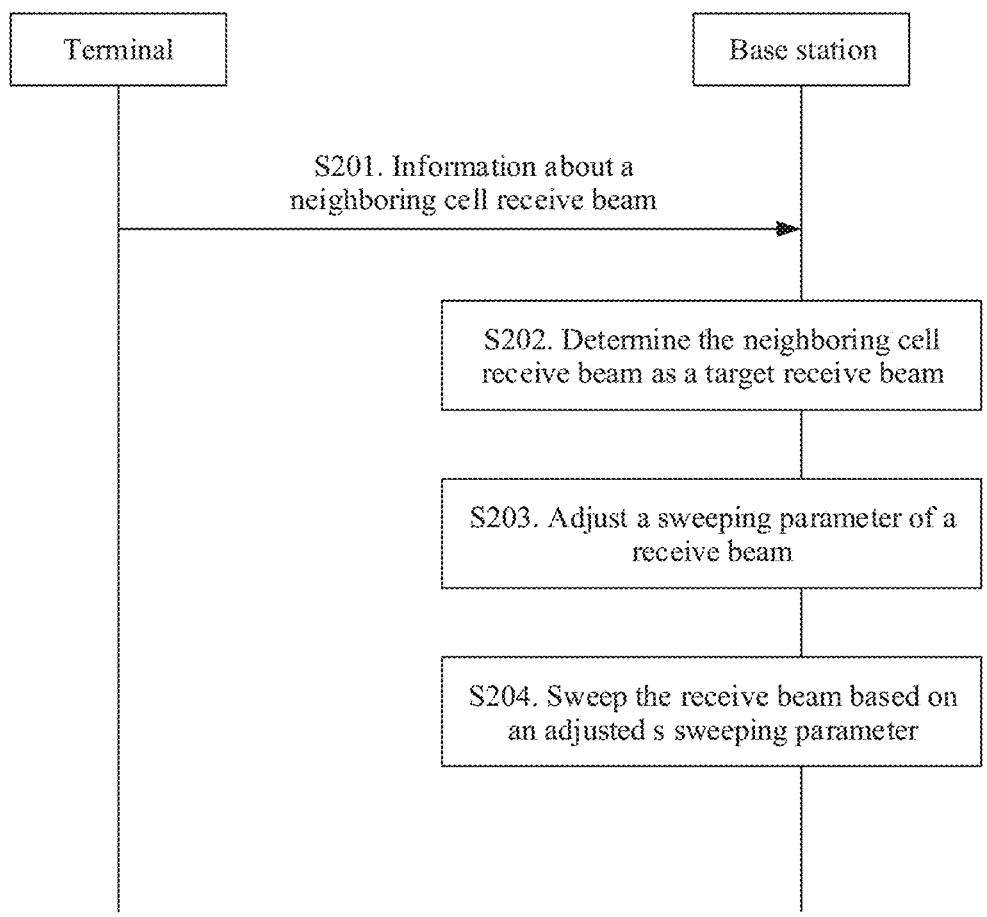
FIG. 13 is another schematic flowchart of a random access method according to an embodiment of the present invention.

Next, FIG. 13 is a schematic flowchart of another random access method according to an embodiment of the present invention. As shown in FIG. 13, the method is applied to receive beam sweeping for a new random access preamble of a handover user. The random access method may include at least the following steps.

S201. A terminal sends information about a neighboring cell receive beam to a base station.

Specifically, when performing cell handover, the terminal measures the neighboring cell receive beam and sends an ID of the neighboring cell receive beam to a target handover cell, that is, a cell covered by the base station that the terminal currently requests to access.

S202. The base station determines the neighboring cell receive beam as a target receive beam.

In a possible implementation, the information about the neighboring cell receive beam is the foregoing cell handover information, and the foregoing prior information includes the cell handover information. The base station may determine the neighboring cell receive beam as the target receive beam based on the cell handover information. For details, refer to the second part (II) in the explanations of the prior information and the target receive beam determined based on the prior information in the foregoing embodiment. Details are not described herein again.

In another possible implementation, the prior information includes the information about the neighboring cell receive beam and cell historical information. The base station may determine the target receive beam based on the prior information. For details, refer to the third part (III) in the explanations of the prior information and the target receive beam determined based on the prior information in the foregoing embodiment. Details are not described herein again. It may be learned that the cell historical information in this case is historical information of the target handover cell, in other words, historical information of a current cell.

S203. The base station adjusts a sweeping parameter of a receive beam.

Specifically, in addition to the sweeping frequency and/or the sweeping period, the sweeping parameter may further include a list of preferably swept beams.

Specifically, in addition to the sweeping frequency and/or the sweeping period, the sweeping parameter may further include the list of preferably swept beams and information about a timer.

The list of preferably swept beams is used to store at least one piece of information, about a neighboring cell receive beam, that is sent by the terminal to the base station, so that the base station adjusts the sweeping parameter of the receive beam based on the information about the neighboring cell receive beam. If a random access preamble sent by the terminal corresponding to the neighboring cell receive beam is received by using the neighboring cell receive beam, the neighboring cell receive beam is deleted from the list of preferably swept beams.

The information about the timer is used to: when the timer expires, if the random access preamble sent by the terminal corresponding to the neighboring cell receive beam is not received on the neighboring cell receive beam, the neighboring cell receive beam is deleted from the list of preferably swept beams.

In a possible implementation, when the cell handover information is the prior information, the base station may add the ID of the neighboring cell receive beam to the list of preferably swept beams, and preferably sweep the neighboring cell receive beam on each slot. When the terminal successfully performs random access on a slot, the base station deletes the neighboring cell receive beam from the list of preferably swept beams.

In a specific implementation, assuming that 56 beams are preset in a cell, the terminal repeatedly sends a random access preamble on each symbol of a PRACH slot. The base station receives the random access preamble on 11 symbols of the PRACH slot through sweeping, and receives the random access preamble on each symbol by using one beam.

It is assumed that a neighboring cell receive beam measured by a terminal is a beam 28, an ID of the neighboring cell receive beam is sent to the target handover cell, and a quantity of preferable receive beams for a random access preamble of the target cell is set to 1. The target handover cell adds the beam 28 to the list of preferably swept beams, and preferably uses the beams in the list to receive the random access preamble starting from a PRACH slot #1. The terminal successfully performs random access on a PRACH slot #2, and the cell deletes the beam 28 from the list of preferably swept beams. A beam sweeping pattern is shown in FIG. 14. Beams indicated by vertical stripes are target receive beams determined based on the cell handover information, namely, neighboring cell receive beams.

In another possible implementation, when the cell handover information is the prior information, the base station may add the ID of the neighboring cell receive beam to the list of preferably swept beams, set the timer, and preferably sweep the neighboring cell receive beam on each slot. When the timer expires, if the terminal fails to perform random access, the base station deletes the neighboring cell receive beam from the list of preferably swept beams.

In a specific implementation, it is assumed that timing of the timer for preferential receive beam sweeping for a random access preamble of the target handover cell is set to 40 ms (a PRACH slot period is set to 10 ms, that is, a quantity of times for the preferential receive beam sweeping for the preamble is set to 4). The terminal still fails to perform random access on a PRACH slot #4, and the cell deletes the beam 28 from the list of preferably swept beams. A beam sweeping pattern is shown in FIG. 15. Beams indicated by vertical stripes are target receive beams determined based on the cell handover information, namely, neighboring cell receive beams.

In another possible implementation, when the prior information includes the cell handover information and the cell historical information, the base station may add the ID of the neighboring cell receive beam to the list of preferably swept beams, and preferably sweep the neighboring cell receive beam on each slot, and adjust the sweeping frequency and/or the sweeping sequence of the target receive beam determined based on the cell historical information. For adjustment of the sweeping frequency of the target receive beam determined based on the cell historical information, refer to a specific implementation of adjusting the sweeping frequency of the receive beam in the foregoing embodiment. For adjustment of the sweeping sequence of the target receive beams determined based on the cell historical information, refer to a specific implementation of adjusting the sweeping sequence of the receive beam in the foregoing embodiment. Details are not described herein again. It may be learned that, for a sweeping sequence of the neighboring cell receive beam determined based on the cell handover information and the target receive beam determined based on the cell historical information, the neighboring cell receive beam may be swept before the target receive beam determined based on the cell historical information, or the target receive beam determined based on the cell historical information may be swept before the neighboring cell receive beam. In this embodiment of the present invention, an example in which the neighboring cell receive beam is swept before the target receive beam determined based on the cell historical information is used for description.

It may be learned that when the terminal successfully performs random access on a slot, the base station deletes the neighboring cell receive beam corresponding to the terminal from the list of preferably swept beams. The base station may further configure the timer. When the timer expires, if the terminal fails to perform random access, the base station deletes the neighboring cell receive beam from the list of preferably swept beams.

In a specific implementation, if 24 beams are preset in a cell, the terminal repeatedly sends a random access preamble on each symbol of a PRACH slot. The base station receives the random access preamble on 11 symbols of the PRACH slot through polling, and receives the random access preamble on each symbol by using one beam.

It is assumed that quantities of random access times, quantities of scheduling times, or quantities of online users on beams 3, 4, 5, 11, 12, 13, 19, 20, and 21 are significantly greater than those on other beams based on cell historical information (average values of the quantities on the beams 3, 4, 5, 11, 12, 13, 19, 20, and 21 each are twice those on the other beams). The beams 3, 4, 5, 11, 12, 13, 19, 20, and 21 are used as target receive beams and are grouped into one group, and a sweeping period is 1.5 PRACH slot periods. Other beams are used as non-target receive beams and are grouped into one group, and a sweeping period is three PRACH slot periods.

Figures 16, 17:
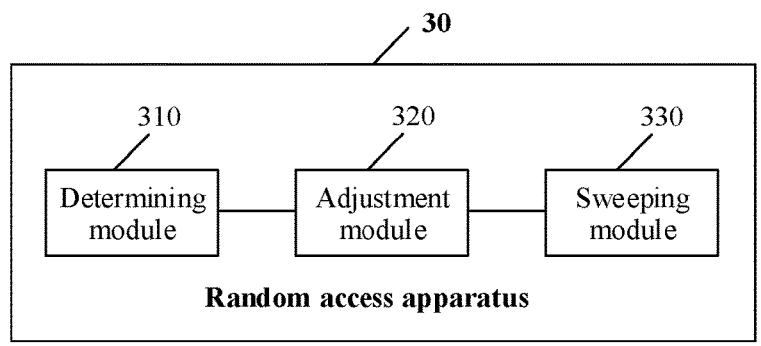
FIG. 16 is another schematic diagram of receive beam polling for a random access preamble according to an embodiment of the present invention.
FIG. 17 is a schematic structural diagram of a random access apparatus according to an embodiment of the present invention.

It is assumed that a neighboring cell receive beam measured by a terminal 1 is a beam 15, and a neighboring cell receive beam measured by a terminal 2 is a beam 7. The terminal 1 and the terminal 2 transmit IDs of the respective neighboring cell receive beams to a target handover cell. A quantity of preferential receive beams for a random access preamble of the target handover cell is set to 2. The target handover cell adds the beams 7 and 15 to a list of preferably swept beams, and preferably uses beams in the list to receive the random access preamble starting from a PRACH slot #1. The terminal 1 successfully performs random access on the PRACH slot #1, and the cell deletes the beam 15 from the list of preferably swept beams. The terminal 2 successfully performs random access on a PRACH slot #3, and the cell deletes the beam 7 from the list of preferably swept beams. A beam sweeping pattern is shown in FIG. 16. Beams indicated by horizontal stripes are target receive beams determined based on the cell historical information. Beams indicated by vertical stripes are target receive beams determined based on the cell handover information, namely, neighboring cell receive beams.

S204. The base station sweeps the receive beam based on an adjusted sweeping parameter.

During implementation of this embodiment of the present invention, the sweeping parameter of the receive beam may be adjusted based on the cell historical information and/or the cell handover information. Specifically, at least one of the following manners may be included: increasing a sweeping frequency of the at least one target receive beam, preferably sweeping the at least one target receive beam, adding a target receive beam in a new beam direction, and adding a target receive beam with a new beam width. This resolves a technical problem in the prior art that a random access latency is introduced by receive beam polling, effectively shortens a random access latency introduced by beam sweeping, and improves user experience.

The methods in the embodiments of the present invention are described in detail above. For ease of better implementing the foregoing solutions in the embodiments of the present invention, correspondingly, related apparatuses used to cooperate in implementing the foregoing solutions are further provided below.

FIG. 17 is a schematic structural diagram of a random access apparatus according to an embodiment of the present invention. A random access apparatus 30 may include a determining module 310, an adjustment module 320, and a sweeping module 330.

The determining module 310 is configured to determine at least one target receive beam based on prior information, where the prior information includes cell historical information and/or cell handover information.

The adjustment module 320 is configured to adjust a sweeping parameter of a target receive beam. The sweeping parameter includes at least one of the following: a sweeping frequency, a sweeping sequence, a beam direction, and a beam width. The receive beam includes the at least one target receive beam. The receive beam is used to receive a random access preamble sent by a terminal, so that after a base station receives, on the receive beam, the random access preamble sent by the terminal, the terminal randomly accesses the base station for data communication.

The sweeping module 330 is configured to sweep the receive beam based on an adjusted sweeping parameter.

In a possible embodiment, the prior information includes the cell historical information; and the target receive beam includes a beam on which a quantity of random access times obtained through statistics collection based on the cell historical information exceeds a first threshold; or the target receive beam includes a beam on which a ratio of a quantity of random access times obtained through statistics collection based on the cell historical information to a quantity of random access times on all beams exceeds a second threshold; or the target receive beam includes a beam on which a quantity of scheduling times obtained through statistics collection based on the cell historical information exceeds a third threshold; or the target receive beam includes a beam on which a ratio of a quantity of scheduling times obtained through statistics collection based on the cell historical information to a quantity of scheduling times on all beams exceeds a fourth threshold; or the target receive beam includes a beam on which a quantity of online users obtained through statistics collection based on the cell historical information exceeds a fifth threshold; or the target receive beam includes a beam on which a ratio of a quantity of online users obtained through statistics collection based on the cell historical information to a quantity of online users on all beams exceeds a sixth threshold.

In a possible embodiment, when the terminal is handed over from a neighboring cell to a target cell, the prior information includes the cell handover information, the cell handover information includes information about a neighboring cell receive beam, the target receive beam includes the neighboring cell receive beam, and the neighboring cell receive beam is a beam used by the terminal in the neighboring cell to perform data communication with a base station to which the neighboring cell belongs.

In a possible embodiment, when the terminal is handed over from a neighboring cell to a target cell, the prior information includes the cell handover information and the cell historical information, and the cell historical information is historical information of the target cell; and the target receive beam includes a neighboring cell receive beam and a beam on which a quantity of random access times obtained through statistics collection based on the cell historical information exceeds a first threshold; or the target receive beam includes a neighboring cell receive beam and a beam on which a ratio of a quantity of random access times obtained through statistics collection based on the cell historical information to a quantity of random access times on all beams exceeds a second threshold; or the target receive beam includes a neighboring cell receive beam and a beam on which a quantity of scheduling times obtained through statistics collection based on the cell historical information exceeds a third threshold; or the target receive beam includes a neighboring cell receive beam and a beam on which a ratio of a quantity of scheduling times obtained through statistics collection based on the cell historical information to a quantity of scheduling times on all beams exceeds a fourth threshold; or the target receive beam includes a neighboring cell receive beam and a beam on which a quantity of online users obtained through statistics collection based on the cell historical information exceeds a fifth threshold; or the target receive beam includes a neighboring cell receive beam and a beam on which a ratio of a quantity of online users obtained through statistics collection based on the cell historical information to a quantity of online users on all beams exceeds a sixth threshold.

In a possible embodiment, the adjustment module 320 is configured to perform at least one of the following operations: increasing a sweeping frequency of the at least one target receive beam, preferably sweeping the at least one target receive beam, adding a target receive beam in a new beam direction, and adding a target receive beam with a new beam width.

In a possible embodiment, the receive beam further includes a non-target receive beam; and a ratio of a sweeping frequency of the target receive beam to a sweeping frequency of the non-target receive beam is directly proportional to a ratio of a quantity of random access times on the target receive beam to a quantity of random access times on the non-target receive beam; or a ratio of a sweeping frequency of the target receive beam to a sweeping frequency of the non-target receive beam is directly proportional to a ratio of a quantity of scheduling times on the target receive beam to a quantity of scheduling times on the non-target receive beam; or a ratio of a sweeping frequency of the target receive beam to a sweeping frequency of the non-target receive beam is directly proportional to a ratio of a quantity of online users on the target receive beam to a quantity of online users on the non-target receive beam.

In a possible embodiment, the sweeping parameter further includes a list of preferably swept beams, and the list of preferably swept beams is used to store at least one piece of information, about a neighboring cell receive beam, that is sent by the terminal to the base station, so that the base station adjusts the sweeping parameter of the receive beam based on the information about a neighboring cell receive beam.

Figure 18:
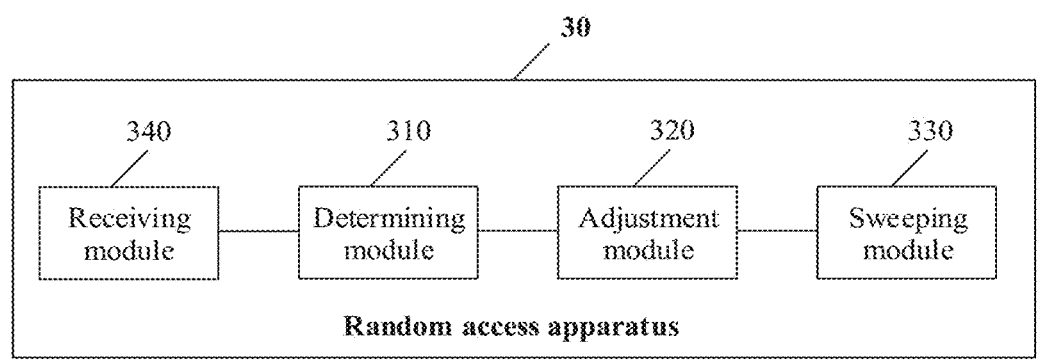
FIG. 18 is another schematic structural diagram of a random access apparatus according to an embodiment of the present invention.

The random access apparatus 30 further includes a receiving module 340, as shown in FIG. 18. The receiving module 340 is configured to: before the determining module 310 determines the at least one target receive beam based on the prior information, receive the information, about the neighboring cell receive beam, that is sent by the terminal.

In a possible embodiment, if the random access preamble sent by the terminal is received by using the neighboring cell receive beam, the list of preferably swept beams does not include the information about the neighboring cell receive beam.

In a possible embodiment, the sweeping parameter further includes information about a timer, and the information about the timer is used to: when the timer expires, if the random access preamble sent by the terminal is not received on the neighboring cell receive beam, the list of preferably swept beams does not include the information about the neighboring cell receive beam.

It may be understood that a function of each function module of the random access apparatus 30 in this embodiment may be specifically implemented according to the method in the foregoing method embodiment, and details are not described herein again.

During implementation of this embodiment of the present invention, the sweeping parameter of the receive beam may be adjusted based on the cell historical information and/or the cell handover information. Specifically, at least one of the following manners may be included: increasing a sweeping frequency of the at least one target receive beam, preferably sweeping the at least one target receive beam, adding a target receive beam in a new beam direction, and adding a target receive beam with a new beam width. This resolves a technical problem in the prior art that a random access latency is caused by receive beam polling, effectively shortens a random access latency caused by beam sweeping, and improves user experience.

Figure 19:
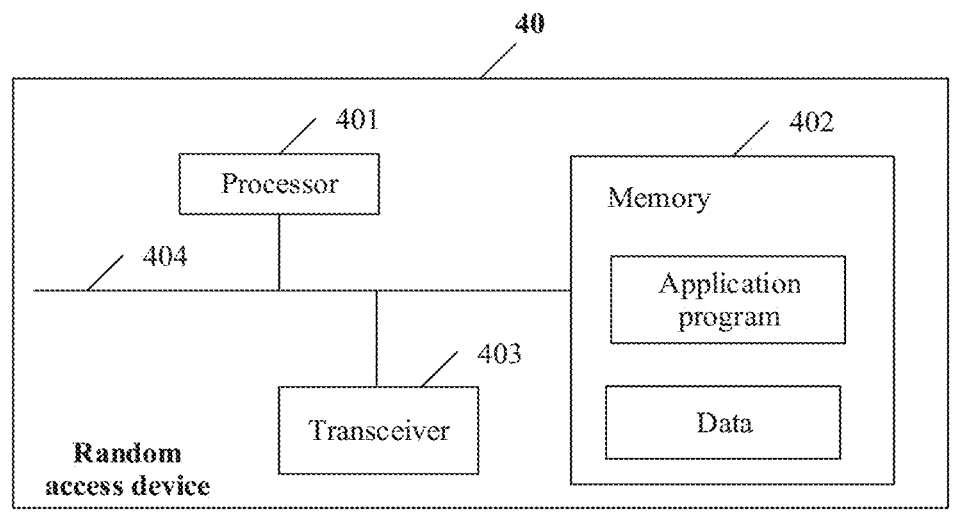
FIG. 19 is a schematic structural diagram of a random access device according to an embodiment of the present invention.

FIG. 19 is a schematic structural diagram of a random access device according to an embodiment of the present invention. As shown in FIG. 19, a random access device 40 may include at least a processor 401, a memory 402, and a transceiver 403. The processor 401, the memory 402, and the transceiver 403 are connected to each other by using a bus 404.

The memory 402 includes but is not limited to a random access memory (RAM), a read-only memory (ROM), an erasable programmable read-only memory (EPROM), or a flash memory. The memory 402 is configured to store a related instruction and data.

The transceiver 403 such as a radio frequency module may include a receiver and a transmitter. That the processor 401 receives or sends a message described below may be specifically understood as that the processor 401 receives or sends a message by using the transceiver.

The processor 401 may be one or more central processing units (CPU). When the processor 401 is one CPU, the CPU may be a single-core CPU or a multi-core CPU.

The processor 401 in the random access device 40 is configured to read program code stored in the memory 402, to perform the following operations:

adjusting a sweeping parameter of at least one target receive beam when at least one target receive beam is determined based on prior information, where the prior information includes cell historical information and/or cell handover information; the sweeping parameter includes at least one of the following: a sweeping frequency, a sweeping sequence, a beam direction, and a beam width; the receive beam includes the at least one target receive beam; and the receive beam is used to receive a random access preamble sent by a terminal, so that after a base station receives, on the receive beam, the random access preamble sent by the terminal, the terminal randomly accesses the base station for data communication; and sweeping the receive beam based on an adjusted sweeping parameter.

In a possible embodiment, the prior information includes the cell historical information; and the target receive beam includes a beam on which a quantity of random access times obtained through statistics collection based on the cell historical information exceeds a first threshold; or the target receive beam includes a beam on which a ratio of a quantity of random access times obtained through statistics collection based on the cell historical information to a quantity of random access times on all beams exceeds a second threshold; or the target receive beam includes a beam on which a quantity of scheduling times obtained through statistics collection based on the cell historical information exceeds a third threshold; or the target receive beam includes a beam on which a ratio of a quantity of scheduling times obtained through statistics collection based on the cell historical information to a quantity of scheduling times on all beams exceeds a fourth threshold; or the target receive beam includes a beam on which a quantity of online users obtained through statistics collection based on the cell historical information exceeds a fifth threshold; or the target receive beam includes a beam on which a ratio of a quantity of online users obtained through statistics collection based on the cell historical information to a quantity of online users on all beams exceeds a sixth threshold.

In a possible embodiment, when the terminal is handed over from a neighboring cell to a target cell, the prior information includes the cell handover information, the cell handover information includes information about a neighboring cell receive beam, the target receive beam includes the neighboring cell receive beam, and the neighboring cell receive beam is a beam used by the terminal in the neighboring cell to perform data communication with a base station to which the neighboring cell belongs.

In a possible embodiment, when the terminal is handed over from a neighboring cell to a target cell, the prior information includes the cell handover information and the cell historical information, and the cell historical information is historical information of the target cell; and the target receive beam includes a neighboring cell receive beam and a beam on which a quantity of random access times obtained through statistics collection based on the cell historical information exceeds a first threshold; or the target receive beam includes a neighboring cell receive beam and a beam on which a ratio of a quantity of random access times obtained through statistics collection based on the cell historical information to a quantity of random access times on all beams exceeds a second threshold; or the target receive beam includes a neighboring cell receive beam and a beam on which a quantity of scheduling times obtained through statistics collection based on the cell historical information exceeds a third threshold; or the target receive beam includes a neighboring cell receive beam and a beam on which a ratio of a quantity of scheduling times obtained through statistics collection based on the cell historical information to a quantity of scheduling times on all beams exceeds a fourth threshold; or the target receive beam includes a neighboring cell receive beam and a beam on which a quantity of online users obtained through statistics collection based on the cell historical information exceeds a fifth threshold; or the target receive beam includes a neighboring cell receive beam and a beam on which a ratio of a quantity of online users obtained through statistics collection based on the cell historical information to a quantity of online users on all beams exceeds a sixth threshold.

In a possible embodiment, that the processor 401 adjusts the sweeping parameter of the receive beam includes at least one of the following operations: increasing a sweeping frequency of the at least one target receive beam, preferably sweeping the at least one target receive beam, adding a target receive beam in a new beam direction, and adding a target receive beam with a new beam width.

In a possible embodiment, the receive beam further includes a non-target receive beam; and a ratio of a sweeping frequency of the target receive beam to a sweeping frequency of the non-target receive beam is directly proportional to a ratio of a quantity of random access times on the target receive beam to a quantity of random access times on the non-target receive beam; or a ratio of a sweeping frequency of the target receive beam to a sweeping frequency of the non-target receive beam is directly proportional to a ratio of a quantity of scheduling times on the target receive beam to a quantity of scheduling times on the non-target receive beam; or a ratio of a sweeping frequency of the target receive beam to a sweeping frequency of the non-target receive beam is directly proportional to a ratio of a quantity of online users on the target receive beam to a quantity of online users on the non-target receive beam.

In a possible embodiment, the sweeping parameter further includes a list of preferably swept beams, and the list of preferably swept beams is used to store at least one piece of information, about a neighboring cell receive beam, that is sent by the terminal to the base station, so that the base station adjusts the sweeping parameter of the receive beam based on the information about a neighboring cell receive beam.

The processor 401 is further configured to: before determining the at least one target receive beam based on the prior information, receive the information, about the neighboring cell receive beam, that is sent by the terminal.

In a possible embodiment, if the random access preamble sent by the terminal is received by using the neighboring cell receive beam, the list of preferably swept beams does not include the information about the neighboring cell receive beam.

In a possible embodiment, the sweeping parameter further includes information about a timer, and the information about the timer is used to: when the timer expires, if the random access preamble sent by the terminal is not received on the neighboring cell receive beam, the list of preferably swept beams does not include the information about the neighboring cell receive beam.

It should be noted that specific implementation of each operation may be further specifically implemented according to the method in the foregoing method embodiment, and details are not described herein again.

During implementation of this embodiment of the present invention, the sweeping parameter of the receive beam may be adjusted based on the cell historical information and/or the cell handover information. Specifically, at least one of the following manners may be included: increasing a sweeping frequency of the at least one target receive beam, preferably sweeping the at least one target receive beam, adding a target receive beam in a new beam direction, and adding a target receive beam with a new beam width. This resolves a technical problem in the prior art that a random access latency is caused by receive beam polling, effectively shortens a random access latency caused by beam sweeping, and improves user experience.

In another embodiment of the present invention, a computer readable storage medium is provided. The computer readable storage medium stores a computer program, the computer program includes a program instruction, and when the program instruction is executed by a processor, the following is implemented: adjusting a sweeping parameter of at least one target receive beam when at least one target receive beam is determined based on prior information, where the prior information includes cell historical information and/or cell handover information; the sweeping parameter includes at least one of the following: a sweeping frequency, a sweeping sequence, a beam direction, and a beam width; the receive beam includes the at least one target receive beam; and the receive beam is used to receive a random access preamble sent by a terminal, so that after a base station receives, on the receive beam, the random access preamble sent by the terminal, the terminal randomly accesses the base station for data communication; and sweeping the receive beam based on an adjusted sweeping parameter.

The computer readable storage medium may be an internal storage unit of a random access device in the foregoing embodiment, for example, a hard disk or memory of the random access device. The computer readable storage medium may also be an external storage device of the random access device, for example, a plug-in hard disk, a smart media card (SMC), a secure digital (SD) card, or a flash card that is disposed on the random access device. Further, the computer readable storage medium may include both the internal storage unit and the external storage device of the random access device. The computer readable storage medium is configured to store the computer program and other programs and data required by the random access device. The computer-readable storage medium may be further configured to temporarily store data that is already output or that is to be output.

In an embodiment of the present invention, a computer program is provided. The computer program includes an instruction, and when the computer program is run on a computer, the instruction is used to perform the following operations: adjusting a sweeping parameter of at least one target receive beam when at least one target receive beam is determined based on prior information, where the prior information includes cell historical information and/or cell handover information; the sweeping parameter includes at least one of the following: a sweeping frequency, a sweeping sequence, a beam direction, and a beam width; the receive beam includes the at least one target receive beam; and the receive beam is used to receive a random access preamble sent by a terminal, so that after a base station receives, on the receive beam, the random access preamble sent by the terminal, the terminal randomly accesses the base station for data communication; and sweeping the receive beam based on an adjusted sweeping parameter.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium may include a magnetic disk, an optical disc, a read-only memory (ROM), a random access memory (RAM), or the like.

A sequence of the steps of the method in the embodiments of the present invention may be adjusted, or steps may be combined or deleted according to an actual requirement.

The modules in the apparatus in the embodiments of the present invention may be combined, divided, or deleted according to an actual requirement.

The foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A random access method, comprising:
   determining at least one target receive beam based on prior information, wherein the prior information comprises at least one of cell historical information or cell handover information, and wherein the cell historical information includes at least one of a quantity of random access times, a quantity of scheduling times, or a quantity of online users obtained through statistics collection on each receive beam in a past time period;

upon determining the at least one target receive beam, adjusting a sweeping parameter of a receive beam, wherein the sweeping parameter comprises at least one of a sweeping frequency, a sweeping sequence, a beam direction, or a beam width, wherein the receive beam comprises the at least one target receive beam, wherein the receive beam is used to receive a random access preamble sent by a terminal, and wherein after a base station receives, on the receive beam, the random access preamble sent by the terminal, the terminal randomly accesses the base station for data communication; and sweeping the receive beam based on the adjusted sweeping parameter;

wherein the prior information comprises the cell historical information, and wherein:

the target receive beam comprises a beam on which a quantity of random access times obtained through statistics collection based on the cell historical information exceeds a first threshold;

the target receive beam comprises a beam on which a ratio of a quantity of random access times obtained through statistics collection based on the cell historical information to a quantity of random access times on all beams exceeds a second threshold;

the target receive beam comprises a beam on which a quantity of scheduling times obtained through statistics collection based on the cell historical information exceeds a third threshold;

the target receive beam comprises a beam on which a ratio of a quantity of scheduling times obtained through statistics collection based on the cell historical information to a quantity of scheduling times on all beams exceeds a fourth threshold;

the target receive beam comprises a beam on which a quantity of online users obtained through statistics collection based on the cell historical information exceeds a fifth threshold; or the target receive beam comprises a beam on which a ratio of a quantity of online users obtained through statistics collection based on the cell historical information to a quantity of online users on all beams exceeds a sixth threshold.

2. The method according to claim 1, wherein the receive beam further comprises a non-target receive beam, and wherein:

a ratio of a sweeping frequency of the target receive beam to a sweeping frequency of the non-target receive beam is directly proportional to a ratio of a quantity of random access times on the target receive beam to a quantity of random access times on the non-target receive beam;

a ratio of a sweeping frequency of the target receive beam to a sweeping frequency of the non-target receive beam is directly proportional to a ratio of a quantity of scheduling times on the target receive beam to a quantity of scheduling times on the non-target receive beam; or a ratio of a sweeping frequency of the target receive beam to a sweeping frequency of the non-target receive beam is directly proportional to a ratio of a quantity of online users on the target receive beam to a quantity of online users on the non-target receive beam.

3. The method according to claim 1, wherein when the terminal is handed over from a neighboring cell to a target cell, the prior information comprises the cell handover information, wherein the cell handover information comprises information about a neighboring cell receive beam, wherein the target receive beam comprises the neighboring cell receive beam, and wherein the neighboring cell receive beam is a beam used by the terminal in the neighboring cell to perform data communication with a base station to which the neighboring cell belongs.

4. The method according to claim 3, wherein the sweeping parameter further comprises a list of preferably swept beams, wherein the list of preferably swept beams is used to store at least one piece of information, about a neighboring cell receive beam, that is sent by the terminal to the base station, wherein the base station adjusts the sweeping parameter of the receive beam based on the information about the neighboring cell receive beam, and wherein:

before the adjusting a sweeping parameter of a receive beam when at least one target receive beam is determined based on prior information, the method further comprises receiving the information, about the neighboring cell receive beam, that is sent by the terminal.

5. The method according to claim 4, wherein if the random access preamble sent by the terminal is received by using the neighboring cell receive beam, the list of preferably swept beams does not comprise the information about the neighboring cell receive beam.

6. The method according to claim 4, wherein the sweeping parameter further comprises information about a timer, and wherein the information about the timer is used to: when the timer expires, if the random access preamble sent by the terminal is not received on the neighboring cell receive beam, the list of preferably swept beams does not comprise the information about the neighboring cell receive beam.

7. The method according to claim 1, wherein when the terminal is handed over from a neighboring cell to a target cell, the prior information comprises the cell handover information and the cell historical information, wherein the cell historical information is historical information of the target cell, and wherein:

the target receive beam comprises a neighboring cell receive beam and a beam on which a quantity of random access times obtained through statistics collection based on the cell historical information exceeds a first threshold;

the target receive beam comprises a neighboring cell receive beam and a beam on which a ratio of a quantity of random access times obtained through statistics collection based on the cell historical information to a quantity of random access times on all beams exceeds a second threshold;

the target receive beam comprises a neighboring cell receive beam and a beam on which a quantity of scheduling times obtained through statistics collection based on the cell historical information exceeds a third threshold;

the target receive beam comprises a neighboring cell receive beam and a beam on which a ratio of a quantity of scheduling times obtained through statistics collection based on the cell historical information to a quantity of scheduling times on all beams exceeds a fourth threshold;

the target receive beam comprises a neighboring cell receive beam and a beam on which a quantity of online users obtained through statistics collection based on the cell historical information exceeds a fifth threshold; or the target receive beam comprises a neighboring cell receive beam and a beam on which a ratio of a quantity of online users obtained through statistics collection based on the cell historical information to a quantity of online users on all beams exceeds a sixth threshold.

8. The method according to claim 1, wherein the adjusting a sweeping parameter of a receive beam comprises at least one of increasing a sweeping frequency of the at least one target receive beam, preferably sweeping the at least one target receive beam, adding a target receive beam in a new beam direction, or adding a target receive beam with a new beam width.

9. The method according to claim 1, wherein the prior information comprises the cell historical information, and wherein the cell historical information comprises a quantity of random access times, a quantity of scheduling times, or a quantity of online users obtained through statistics collection on each receive beam in a past time period.

10. A random access device, comprising:
at least one processor; and
a non-transitory computer-readable storage medium coupled to the at least one processor and storing programming instructions for execution by the at least one processor, wherein the programming instructions instruct the at least one processor to perform operations comprising:
determining at least one target receive beam based on prior information, wherein the prior information comprises at least one of cell historical information or cell handover information, and wherein the cell historical information includes at least one of a quantity of random access times, a quantity of scheduling times, or a quantity of online users obtained through statistics collection on each receive beam in a past time period;
upon determining the at least one target receive beam, adjusting a sweeping parameter of a receive beam, wherein the sweeping parameter comprises at least one of a sweeping frequency, a sweeping sequence, a beam direction, and a beam width, wherein the receive beam comprises the at least one target receive beam, wherein the receive beam is used to receive a random access preamble sent by a terminal, and wherein after a base station receives, on the receive beam, the random access preamble sent by the terminal, the terminal randomly accesses the base station for data communication; and
sweeping the receive beam based on the adjusted sweeping parameter;
wherein the prior information comprises the cell historical information, and wherein:
the target receive beam comprises a beam on which a quantity of random access times obtained through statistics collection based on the cell historical information exceeds a first threshold;
the target receive beam comprises a beam on which a ratio of a quantity of random access times obtained through statistics collection based on the cell historical information to a quantity of random access times on all beams exceeds a second threshold;
the target receive beam comprises a beam on which a quantity of scheduling times obtained through statistics collection based on the cell historical information exceeds a third threshold;

the target receive beam comprises a beam on which a ratio of a quantity of scheduling times obtained through statistics collection based on the cell historical information to a quantity of scheduling times on all beams exceeds a fourth threshold;
the target receive beam comprises a beam on which a quantity of online users obtained through statistics collection based on the cell historical information exceeds a fifth threshold; or
the target receive beam comprises a beam on which a ratio of a quantity of online users obtained through statistics collection based on the cell historical information to a quantity of online users on all beams exceeds a sixth threshold.

11. The device according to claim 10, wherein the receive beam further comprises a non-target receive beam, and wherein:
a ratio of a sweeping frequency of the target receive beam to a sweeping frequency of the non-target receive beam is directly proportional to a ratio of a quantity of random access times on the target receive beam to a quantity of random access times on the non-target receive beam;
a ratio of a sweeping frequency of the target receive beam to a sweeping frequency of the non-target receive beam is directly proportional to a ratio of a quantity of scheduling times on the target receive beam to a quantity of scheduling times on the non-target receive beam; or
a ratio of a sweeping frequency of the target receive beam to a sweeping frequency of the non-target receive beam is directly proportional to a ratio of a quantity of online users on the target receive beam to a quantity of online users on the non-target receive beam.

12. The device according to claim 10, wherein when the terminal is handed over from a neighboring cell to a target cell, the prior information comprises the cell handover information, wherein the cell handover information comprises information about a neighboring cell receive beam, wherein the target receive beam comprises the neighboring cell receive beam, and wherein the neighboring cell receive beam is a beam used by the terminal in the neighboring cell to perform data communication with a base station to which the neighboring cell belongs.

13. The device according to claim 12, wherein the sweeping parameter further comprises a list of preferably swept beams, wherein the list of preferably swept beams is used to store at least one piece of information, about a neighboring cell receive beam, that is sent by the terminal to the base station, wherein the base station adjusts the sweeping parameter of the receive beam based on the information about the neighboring cell receive beam, and wherein the at least one processor is further configured to:
before determining the at least one target receive beam based on the prior information, receive the information, about the neighboring cell receive beam, that is sent by the terminal.

14. The device according to claim 13, wherein if the random access preamble sent by the terminal is received by using the neighboring cell receive beam, the list of preferably swept beams does not comprise the information about the neighboring cell receive beam.

15. The device according to claim 13, wherein the sweeping parameter further comprises information about a timer, and wherein the information about the timer is used to: when the timer expires, if the random access preamble sent by the terminal is not received on the neighboring cell receive beam, the list of preferably swept beams does not comprise the information about the neighboring cell receive beam.

16. The device according to claim 10, wherein when the terminal is handed over from a neighboring cell to a target cell, the prior information comprises the cell handover information and the cell historical information, wherein the cell historical information is historical information of the target cell, and wherein:
   the target receive beam comprises a neighboring cell receive beam and a beam on which a quantity of random access times obtained through statistics collection based on the cell historical information exceeds a first threshold;
   the target receive beam comprises a neighboring cell receive beam and a beam on which a ratio of a quantity of random access times obtained through statistics collection based on the cell historical information to a quantity of random access times on all beams exceeds a second threshold;
   the target receive beam comprises a neighboring cell receive beam and a beam on which a quantity of scheduling times obtained through statistics collection based on the cell historical information exceeds a third threshold;
   the target receive beam comprises a neighboring cell receive beam and a beam on which a ratio of a quantity of scheduling times obtained through statistics collection based on the cell historical information to a quantity of scheduling times on all beams exceeds a fourth threshold;
   the target receive beam comprises a neighboring cell receive beam and a beam on which a quantity of online users obtained through statistics collection based on the cell historical information exceeds a fifth threshold; or
   the target receive beam comprises a neighboring cell receive beam and a beam on which a ratio of a quantity of online users obtained through statistics collection based on the cell historical information to a quantity of online users on all beams exceeds a sixth threshold.

17. The device according to claim 10, wherein the adjusting, by the at least one processor, a sweeping parameter of a receive beam comprises at least one of increasing a sweeping frequency of the at least one target receive beam, preferably sweeping the at least one target receive beam, adding a target receive beam in a new beam direction, or adding a target receive beam with a new beam width.

18. The device according to claim 10, wherein the prior information comprises the cell historical information, and wherein the cell historical information comprises a quantity of random access times, a quantity of scheduling times, or a quantity of online users obtained through statistics collection on each receive beam in a past time period.

* * * * *